United States Patent
Hernandez et al.

(10) Patent No.: US 9,980,017 B2
(45) Date of Patent: May 22, 2018

(54) COMPACT NETWORKING DEVICE FOR REMOTE STATIONS

(71) Applicant: Ubiquiti Networks, Inc., San Jose, CA (US)

(72) Inventors: Carlos E. Hernandez, San Jose, CA (US); Tianshu Chen, San Jose, CA (US)

(73) Assignee: UBIQUITI NETWORKS, INC., New York, NY (US)

( * ) Notice: Subject to any disclaimer, the term of this patent is extended or adjusted under 35 U.S.C. 154(b) by 106 days.

(21) Appl. No.: 14/980,826

(22) Filed: Dec. 28, 2015

(65) Prior Publication Data

US 2016/0192037 A1 Jun. 30, 2016

Related U.S. Application Data

(60) Provisional application No. 62/096,711, filed on Dec. 24, 2014.

(51) Int. Cl.
*H04L 12/931* (2013.01)
*H04Q 1/02* (2006.01)
*H04W 88/08* (2009.01)

(52) U.S. Cl.
CPC ............ *H04Q 1/155* (2013.01); *H04L 49/40* (2013.01); *H04W 88/08* (2013.01)

(58) Field of Classification Search
None
See application file for complete search history.

(56) References Cited

U.S. PATENT DOCUMENTS

| 6,411,825 | B1 | 6/2002 | Csapo et al. | |
|---|---|---|---|---|
| 6,640,111 | B1* | 10/2003 | Shapira | H01Q 1/246 455/14 |
| 2015/0029057 | A1* | 1/2015 | Zhang | H01Q 1/246 342/368 |
| 2016/0094985 | A1* | 3/2016 | Chong | H04W 8/205 455/558 |

FOREIGN PATENT DOCUMENTS

| CN | 101385014 A | 3/2009 |
|---|---|---|
| EP | 2814183 A1 | 12/2014 |
| WO | 2003019799 A2 | 3/2003 |
| WO | 2007130139 A | 11/2007 |
| WO | 2014092639 A2 | 6/2014 |

* cited by examiner

*Primary Examiner* — Chi H Pham
*Assistant Examiner* — Shick Hom
(74) *Attorney, Agent, or Firm* — Shun Yao; Park, Vaughan, Fleming & Dowler LLP

(57) ABSTRACT

A tower-mounted networking device facilitates deploying a remote station without having to build a custom station aside a radio tower. The networking device's chassis comprises a mounting bracket, which includes a curved contour for mounting the networking device on the radio tower. Also, the chassis can be resistant to weather intrusion, by not including a vent, to allow the networking device to be installed outdoors. The networking device can include a first power port coupled to an external connection line from a source external to the tower, such that the external connection line provides at least power to the networking device. The networking device can use the power to power a set of antenna mounted on the radio tower. The networking device can also relay a network connection between a pair of antennas, and/or between an antenna and a network connection to an Internet service provider.

29 Claims, 31 Drawing Sheets

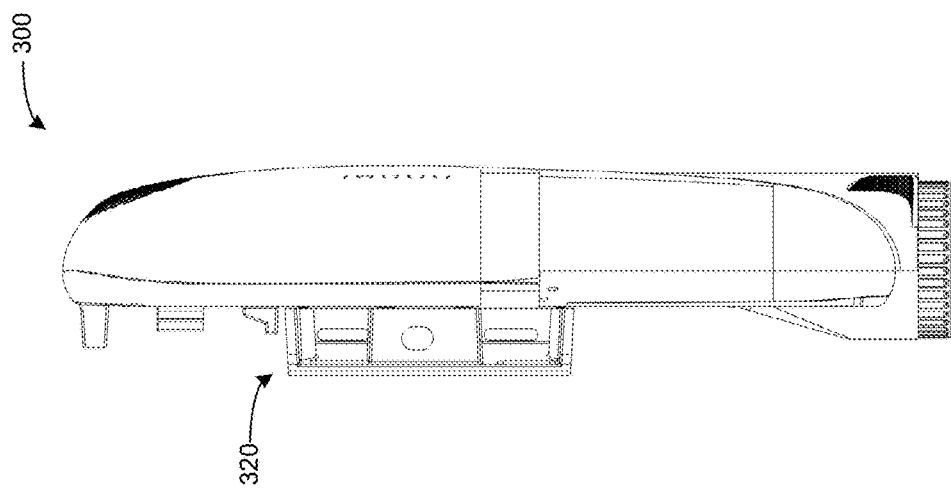
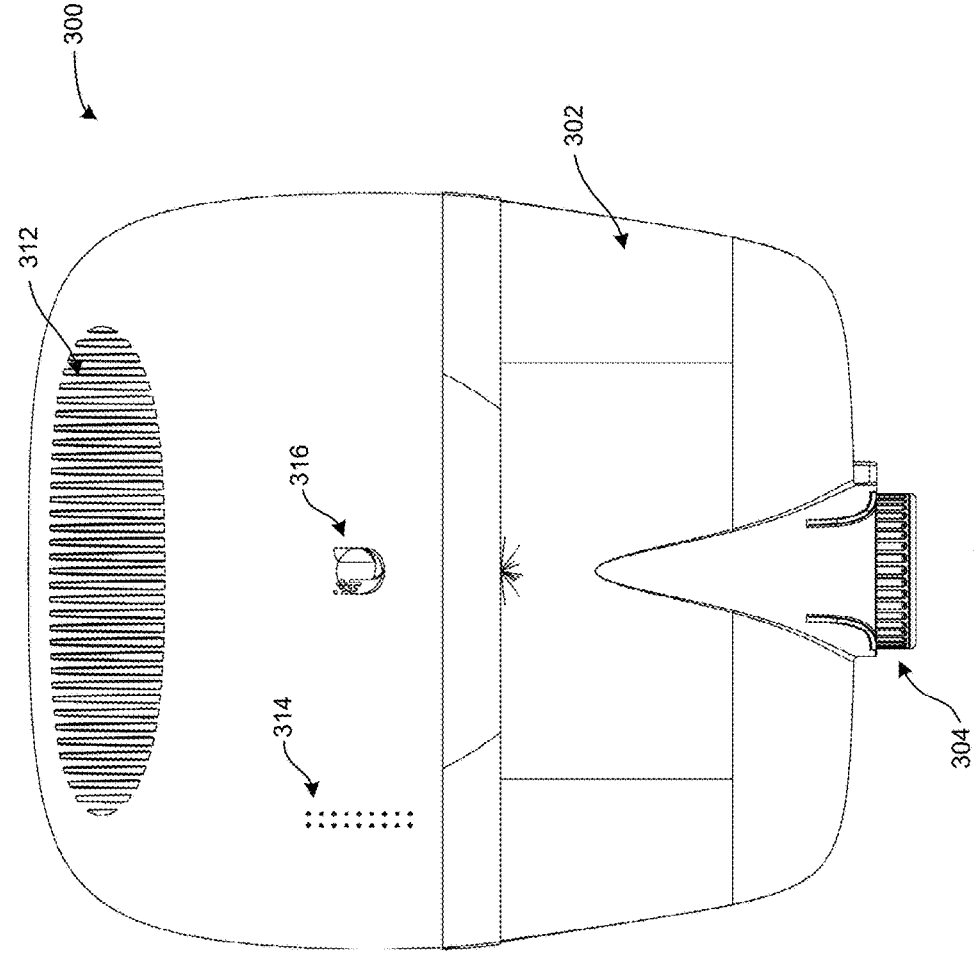

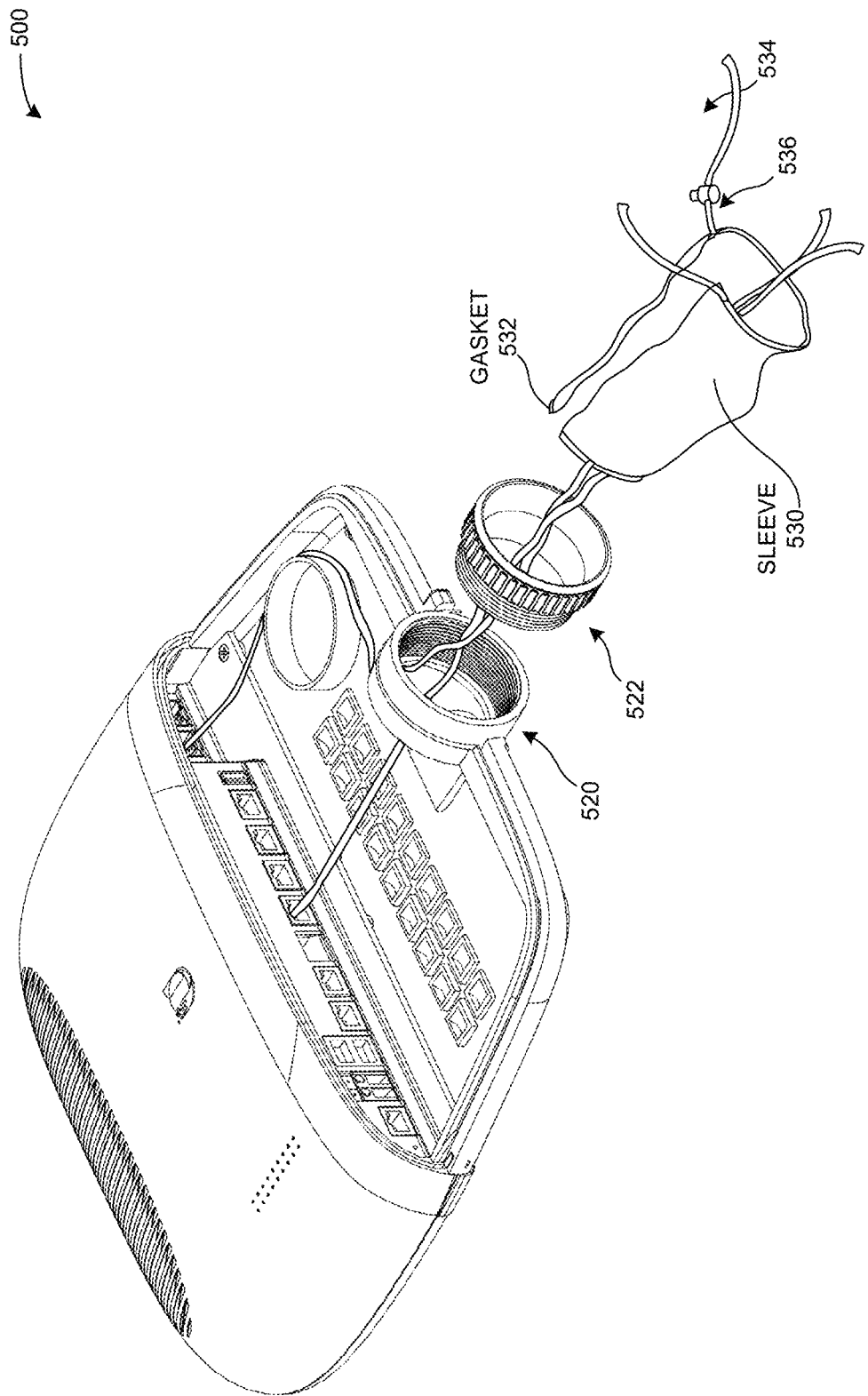

COMPACT NETWORKING DEVICE FOR REMOTE STATIONS

RELATED APPLICATION

This application claims the benefit of U.S. Provisional Application No. 62/096,711, entitled "COMPACT EDGE ROUTER FOR REMOTE STATIONS," by inventors Carlos E. Hernandez and Tianshu Chen, filed 24 Dec. 2014, the disclosure of which is incorporated herein in its entirety.

BACKGROUND

Field

This disclosure is generally related to remote stations for wireless computer networks. More specifically, this disclosure is related to a compact networking device that can be easily mounted on a radio tower or at other a hard-to-reach locations.

Related Art

Cellular networks are typically realized using point-to-multipoint radios mounted on a radio tower, driven by a base station set up at the base of the tower. Also, some Internet service providers (ISPs) provide Internet connectivity to remote locations by installing radio towers that use point-to-point antennas to relay the network connection to the remote location. Some radio towers include both point-to-point and point-to-multipoint radios that are driven by a ground-level base station at the base of the tower.

Oftentimes, these base stations are put together using existing networking components that are configured to work together to achieve a desired goal. These components typically include routers, switches, power supplies, and server computers that are installed on a server rack and enclosed in a metal cabinet with ventilation. Deploying a remote station is a tedious job that requires a technician to select which components to install into the cabinet, and to decide how to configure each of these components.

In many cases, it can be difficult and time consuming for a technician to maintain these remote stations. This is because the technician may need to connect to each individual component installed in the cabinet to determine its status, and to diagnose any potential problems. To make matters worse, service providers may change the strategy they use to set up these remote stations over time, which results in their remote stations having different configurations from each other.

Unfortunately, this results in non-homogenous remote stations that each has a different set of hardware or software components, and each needs to be monitored or controlled in a different way. This non-homogenous nature can cause a technician valuable time in servicing a remote station deployed using equipment that the technician has little or no experience with, as it can require the technician to first decipher how the remote station has been set up before he can even determine what he can do to service or repair the remote station.

SUMMARY

One embodiment provides a tower-mounted computer networking device apparatus that facilitates deploying a remote station without having to build a custom station aside a radio tower. The networking device's chassis comprises a mounting bracket, which includes a curved contour for mounting the networking device on an antenna tower. Also, the chassis can be resistant to weather intrusion, by not including a vent, to allow the networking device to be installed outdoors. The networking device can include a first power port coupled to an external connection line from a source external to the tower, such that the external connection line provides at least power to the networking device. The networking device also includes a second network port coupled to a first radio transceiver, and a third network port coupled to a second radio transceiver.

In some embodiments, the radio device includes a radio transmitter, a radio receiver, and/or a radio transceiver.

In some embodiments, the networking device includes a power module to receive power from the first network port, provide power to the first radio transceiver via the second network port, and provide power to the second radio transceiver via the third network port. The networking device also includes a packet-forwarding module to route network packets between the second network port and the third network port.

In some embodiments, the external connection line originates from one or more of a ground-level power source, a ground-level telecommunications line, an overhead power line, and an overhead telecommunications line.

In some embodiments, the first power port is a network port, and the external connection line does not include a network connection.

In some embodiments, the first power port is a network port, and the external connection line includes a network connection. Moreover, the packet-forwarding module can also route network packets between the first network port and the second network port, and can route network packets between the first network port and the third network port.

In some embodiments, the networking device can include a second power port coupled to a power line from a solar panel mounted on the tower.

In some variations on these embodiments, the first power port is a primary power source, and the second power port is a secondary power source.

In some further variations on these embodiments, the power module can determine whether the primary power source is active. Also, responsive to determining that the primary power source is not active, the power module can receive power from the secondary power source.

In some embodiments, the mounting bracket also includes a set of screw holes for mounting the networking device on a flat surface.

In some embodiments, the networking device also includes a patch panel on a front face of the networking device, such that the patch panel includes at least the first and second network ports. The networking device also includes a panel cover comprising a locking mechanism that, when the panel cover is installed over the patch panel, the locking mechanism penetrates through a chassis of the networking device to a rear face of the networking device.

In some variations on these embodiments, the locking mechanism includes a lock hole for a lock, such that attaching a lock through the lock hole secures the panel cover to the patch panel.

In some embodiments, the networking device can include a motherboard comprising two or more heat sources, and can include a heat sink. The networking device can also include two or more heat pipes, such that a respective heat pipe is coupled to a corresponding heat source at one end, and the two or more heat pipes are coupled to the same heat sink at an opposing end.

In some embodiments, the two or more heat sources can include a communications microchip, a microprocessor, a power transistor, and a signal-amplifying microchip.

In some variations on these embodiments, a rear face of the chassis includes a set of heat fins that are in thermal contact with the heat sink.

In some variations on these embodiments, the set of heat fins do not include a vent.

In some variations on these embodiments, a front face of the chassis includes a set of heat fins above the heat sink.

In some variations on these embodiments, the set of heat fins do not include a vent.

One embodiment provides a computer networking device apparatus that receives power via a Power-over-Ethernet cable or a Power-over-Fiber cable. The networking device includes a mounting bracket, which includes a curved contour for mounting the networking device on an antenna tower. The networking device can also include a first network port coupled to a connection line from a source external to the tower, such that the connection line provides to the networking device at least power, and a network connection. The networking device can also include a second network port coupled to a radio transceiver.

In some embodiments, the networking device can include a power module to receive power from the first network port, and provide power to the first radio transceiver via the second network port. The networking device can also include a packet-forwarding module to route network packets between the first network port and the second network port.

In some embodiments, the first network port is a Power-over-Ethernet (PoE) network port, and/or a Power-over-Fiber network port.

In some embodiments, the second network port is a Power-over-Ethernet (PoE) port.

One embodiment provides a computer networking device apparatus that only receives power from a ground line, and relays network signals between radio antennas mounted on a radio router. Specifically, the networking device is not coupled to an external network connection line from a source external to the tower. The networking device can include a mounting bracket, which includes a curved contour for mounting the networking device on the antenna tower. The networking device includes a power port coupled to a power line from a solar panel mounted on the tower, such that the power line provides power to the networking device. Also, the networking device includes a first network port coupled to a first radio transceiver, and includes a second network port coupled to a second radio transceiver.

In some embodiments, the networking device includes a power module to receive power from the power port, provide power to the first radio transceiver via the first network port, and provide power to the second radio transceiver via the second network port. Also, the networking device includes a packet-forwarding module to route network packets between the first network port and the second network port.

In some embodiments, the power port is a Power-over-Ethernet (PoE) network port, and/or a Power-over-Fiber network port.

One embodiment provides a cloud-based controller that facilitates monitoring and/or configuring a plurality of networking devices deployed over a wide geographic region. During operation, the controller can receive a request, from a client device, to monitor one or more networking devices. The controller determines a location for the one or more tower-mounted networking devices, and determining a set of transceivers coupled to a respective networking device. The controller can generate a user interface which overlays device icons for the one or more networking devices over a geographic region, based on a geographic location for the one or more networking devices. A device icon for a respective networking device illustrates at least a signal strength associated with the respective networking device.

In some embodiments, the status can include a network throughput for a predetermined network port, a signal strength for a predetermined transceiver, an aggregate signal strength for one or more transceivers, and/or an average signal strength for one or more transceivers.

In some embodiments, responsive to receiving a user selection for the respective networking device, the controller can update the user interface to present detailed information on the respective networking device.

In some embodiments, the detailed information can include a configuration for one or more components of the networking device, an operating state for the one or more components of the networking device, an alert associated with a misconfigured or underperforming components of the networking device, and/or a diagnosis associated with the alert.

In some embodiments, the controller can receive a device configuration for a respective networking device, and configures the respective networking device based on the received device configuration.

BRIEF DESCRIPTION OF THE FIGURES

FIG. 3B shows a front view of a network device chassis in accordance with an embodiment.

FIG. 3C illustrates a side profile of a networking device in accordance with an embodiment.

FIG. 5F illustrates an exemplary cable sleeve being wrapped or unwrapped from a set of cables in accordance with an embodiment.

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a networking device that facilitates deploying a remote station without having to build a custom station aside a radio tower. This networking device provides a unified station that is easy to deploy, and provides a unified user interface for configuring the remote station's features. In some embodiments, the networking device can include a network switch, an edge router, a server computer, or any device deployed in a computer network.

Moreover, some networking devices (e.g., routers and switches) can be deployed across multiple physical sites, which can make it easier for the service provider (e.g., an Internet service provider, or ISP) to manage these devices remotely or on-site. For example, the service provider can access a cloud-based user interface (UI) that can remotely control or configure a set of networking devices. Alternatively, the service provider can access UI provided by the networking device on-site, such that this router-provided UI is uniform across all remote stations.

Deploying the networking device is more cost-effective for the provider than deploying a custom remote station. This is because each remote station device can cost less than the various separate components that need to be purchased to construct the custom remote station. Also, technicians may need less training to know how to configure or repair the various remote station devices, and technicians may need to spend less time to manage the remote station devices (e.g., may need less technicians).

In some embodiments, the networking device can have a small profile that may be easily lifted by one person, and can be easily affixed to a pole. These features make the networking device easier to install on top of an antenna tower along with one or more antennas. Being able to install the networking device atop a radio tower can make it less likely that the networking device will become damaged, be tampered with, or stolen by a malicious entity. It is currently not possible for service providers to install a remote station on top of a tower, given that remote stations are typically installed in a large chassis that houses a multitude of power, computing, and networking components.

Figure 1:
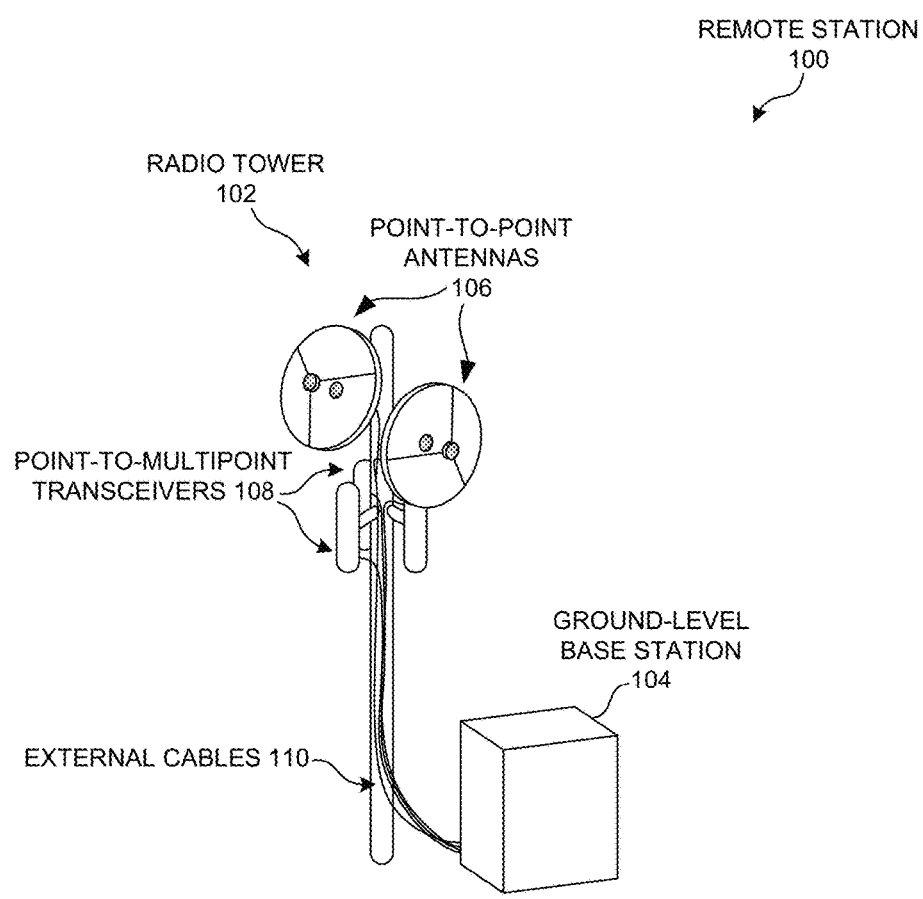
FIG. 1 illustrates a typical remote station realized using a radio tower with a ground-level base station in accordance with an embodiment.

FIG. 1 illustrates a typical remote station 100 realized using a radio tower 102 with a ground-level base station 104 in accordance with an embodiment. Radio tower 102 can include one or more point-to-point radios 106, and can include one or more cellular transceivers 108. Specifically, radios 106 and transceivers 108 are powered by ground-level base station 104 via multiple external cables 110 that travel from ground-level base station 104, up radio tower 102, and onto each radio 106 and transceiver 108. External cables 110 can include a multitude of cables, comprising at least a signal line for each radio, and a power line for each radio. The length of external cables 110 can affect the service quality of radio tower 102 due to radio frequency (RF) interference, or tampering by malicious individuals or animals.

In some embodiments, a service provider may attempt to discourage unauthorized people from tampering with ground-level base station 104, radios 106, and/or transceivers 108 by surrounding radio tower 102 and ground-level base station 104 by a security barrier (e.g., using a mesh fence or using other security features). However, having to deploy a security barrier introduces additional costs and inefficiencies. The service provider needs to purchase and install these security barriers across multiple remote stations 100. Also, if the security barrier is a fence that includes a key lock, the service provider will also need to ensure that the technicians have the appropriate keys to access each remote station they are allowed to operate.

Figure 2A:
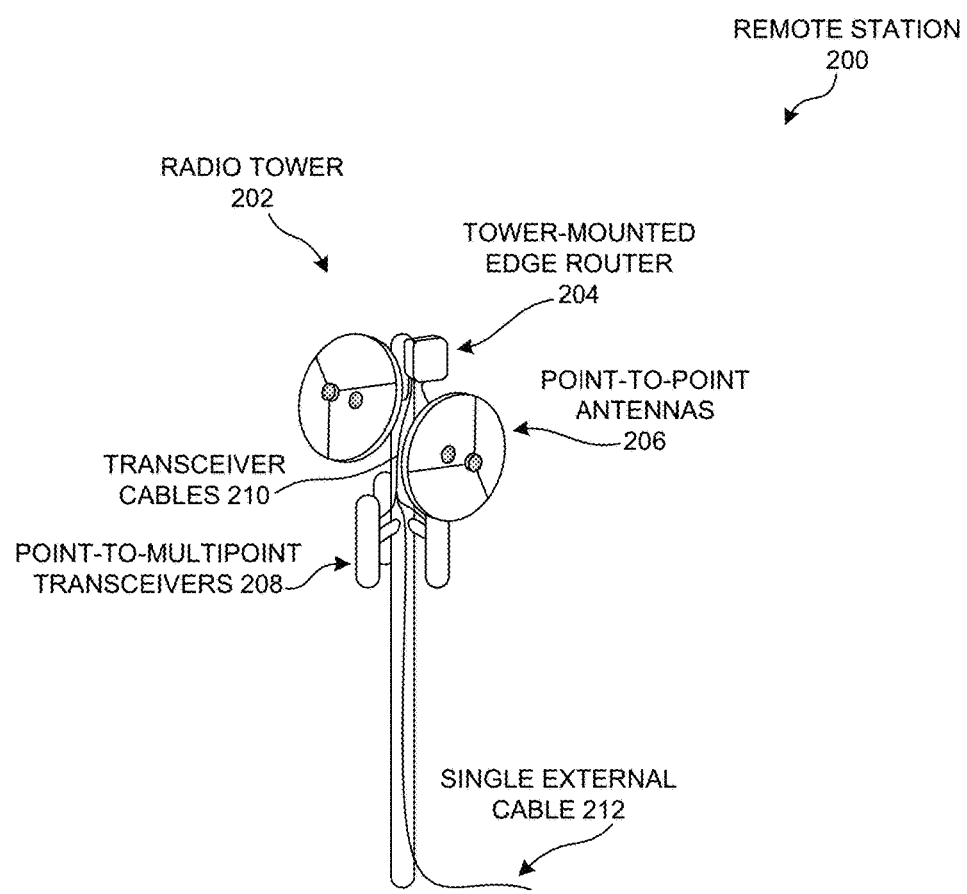
FIG. 2A illustrates a remote station that includes an exemplary radio tower with a tower-mounted networking device in accordance with an embodiment.

FIG. 2A illustrates a remote station 200 that includes an exemplary radio tower 202 with a tower-mounted networking device 204 in accordance with an embodiment. In some embodiments, networking device 204 provides a unified station that is simple, scalable, and easy to deploy. Networking device 204 includes a built-in mounting bracket which allows networking device 204 to be mounted on a pole, or installed above ground easily. This is not possible with typical rack-mount systems, which require an external server rack to hold the off-the-shelf components.

For example, unlike typical remote stations whose networking components are installed at the floor level (and in easy reach of malicious entities), networking device 204 can be installed high on radio tower 202 or any other hard-to-reach location. Hence, radio tower 202 itself can be a security barrier that discourages malicious entities from tampering with networking device 204. If one were to want to steal or tamper with tower-mounted networking device 204, that person would need to climb up radio tower 202, past any security barriers (e.g., a security barrier on radio tower 202), until that person reaches networking device 204, which is difficult to do. This difficulty in climbing up to reach networking device 204 serves as an additional security feature that is not possible when using existing floor-level remote stations.

Radio tower 202 can have multiple point-to-point radios 206 and/or transceivers 208, pointing toward different directions and different zones. For example, each antenna 206 may only cover a 60-degree area, and so radio tower 202 may include six antennas to cover a 360-degree perimeter. Networking device 204 can also support multiple point-to-multipoint antennas, such as to provide Wi-Fi connections (e.g., via a Wi-Fi antenna) or cellular connections (e.g., via a cellular antenna) to multiple devices.

In some embodiments, networking device 204 is itself resistant to weather intrusion, which also cuts on the costs of deploying a remote station, as the service provider does not need to purchase an additional weather-resistant cabinet to house networking equipment. Networking device 204 can include high-power circuits for driving high-power radios, and includes a chassis that successfully radiates heat away from these high-power circuits without requiring ventilation ports. This vent-less design allows networking device 204 to function in a variety of weather conditions, such as rain, snow, wind, dust, etc.

In some embodiments, networking device 204 can also be deployed in an indoor environment, such as a stadium, a large mall, a casino, an airport, etc. If installed indoor, the low profile of networking device 204 makes it easier to install behind a wall, so that only the antenna is exposed to the open area. Also, if networking device 204 is installed out in the open, the low profile of networking device 204 is not a visual nuisance as a custom-built station that includes various components installed as a rack-mount system.

In some embodiments, antennas 206 and/or 208 may communicate using a different frequency to avoid interfering with each other. Networking device 204 can make it easy to deploy such a system since the only wiring needed is to connect each antenna 206 or 208 to a dedicated port on networking device 204, and connecting networking device 204 to a wide area network (WAN) and a power supply via a single external cable 212. The only wires that need to run down the pole of radio tower 202 are for the power supply, and sometimes for a network connection.

In some embodiments, networking device 204 may only need to receive a single external cable 212 that provides both the WAN connection and power. Networking device 204 can provide power to antennas 206, transceivers 208, and/or other components mounted on tower 202 via a PoE connection. For example, external cable 212 can include a Power-over-Ethernet (PoE) cable that provides a 24 V power line and a network connection via the Ethernet cable.

As another example, an ISP can provide a cable connection that provides an optical fiber for transferring data, as well as a separate connection within the cable for providing electrical power. Networking device 204 can receive the WAN connection and power via a single Power-over-Fiber external cable 212 that includes two fiber optic cables (e.g., for a full-duplex WAN connection), and includes a power line (e.g., a 24 V or 50 V power line).

Alternatively, single external cable 212 may include both a PoE connection and a fiber-optic connection. For example, the ISP may provide power via a PoE connection (e.g., a legacy connection), and may provide network connectivity via one or more separate fiber optic cables. As another variation, single external cable 212 may include a dedicated power line for networking device 204, and may include one or more network connections for networking device 204 (e.g., a fiber optic cable for fast connectivity, and an Ethernet cable for a backup connectivity). As yet another variation, single external cable 212 can include multiple lines for power and/or network connections, and networking device 204 chooses (at runtime) which line provides the necessary power and network connectivity.

In some embodiments, networking device 204 can be used to deploy a point-to-point connection (e.g., using antennas 206). Hence, the only wire that may need to be included in external cable 212 may be for power. For example, radio tower 202 may be configured to function as a relay, where one antenna 206 provides a point-to-point connection to a remote upstream antenna (e.g., a WAN, or an ISP), and at least one other local antenna 206 provides a point-to-point connection to a remote downstream antenna (e.g., to a village, or to the next station). Radio tower 202 may include multiple antennas 206 that each relays the network connection to a different remote station. Radio tower 202 can include additional antennas or transceivers 208 that may provide a network connection to nearby devices, such as via a Wi-Fi or cellular connection.

Networking device 204 is interoperable with different antenna manufacturers, and with different network equipment manufacturers. Hence, one radio tower 202 that is deployed with tower-mounted networking device 204 can still interoperate with equipment on other antenna towers, even if the other antenna tower uses an antenna with a different manufacturer or brand than the local antenna tower, or uses different network equipment to provide power or network connection to its antenna. Networking device 204 can still manage the communication between the two antenna towers.

In some embodiments, networking device 204 can provide a web-based UI, which allows a technician to configure networking device 204 without having to climb up radio tower 202. The technician may access this UI locally via a transceiver 208 mounted on radio tower 202, or via a cloud-based service hosted on a distant server computer.

For example, if a network connection exists to networking device 204, the technician can configure networking device 204 via the network connection (e.g., via a WAN accessible via external cable 212, an antenna 206, or a transceiver 208). However, if the WAN network connection is down and networking device 204 is operational (e.g., has power and is functional), the technician can configure networking device 204 locally via a Wi-Fi or cellular transceiver 208 mounted on radio tower 202.

The technician can determine the status of a plurality of networking devices deployed over a wide area by using the cloud controller to ping each networking device and determine its status. The cloud controller can include a computer cluster that manages a plurality of networking devices for an entity (e.g., an ISP, or a company with a closed network), or for multiple entities. The cloud controller can get location information from each networking device, and can display the location of each networking device on a map, along with icons that each represents a current status of a corresponding networking device. The cloud controller can communicate with various networking devices remotely to keep track of their status and configuration, and can present this diagnostic information to a technician via the cloud-based UI so that the technician does not need to diagnose a radio tower in-person. If a networking device is malfunctioning or underperforming, the technician may decide to take down and replace the networking device as an easy fix.

In some embodiments, the cloud controller can also get diagnostic information from networking device 204 and present this diagnostic information to the technician on a map UI. The diagnostic information can include a configuration of networking device 204, performance information (e.g., throughput information), information on the radios or antennas coupled to networking device 204, information on one or more power sources, etc.

Presenting this diagnostic information for multiple radio towers to the technician in one unified user interface (UI) saves the technician time in keeping track of the various antennas and remote stations. This is a significant advantage over existing remote stations, where it is not possible to visualize the status of multiple remote stations in a unified UI, given that each remote station includes components from different manufacturers, and different remote stations may not have matching equipment. Hence, with existing systems, a technician would have to manually ping each component of each remote station (e.g., each switch, each antenna, etc.) to determine its individual status. This makes it time consuming for the technician to debug a remote station, or to ensure that the remote station is operating normally.

The cloud-based UI can also provide a device-specific UI that displays status information and configuration options for a given networking device, such as which antennas are coupled to the networking device, the signal quality and bandwidth of each antenna, etc. This device-specific UI allows the technician to perform a detailed analysis of a given networking device, for example, to determine whether a given radio tower needs servicing, for example, to determine whether a given networking device or antenna needs to be repaired or replaced.

Also, repairing or replacing networking device 204 is easier than debugging a malfunctioning a custom remote station. For example, a technician can upgrade, reconfigure, or debug a radio tower 202 by quickly replacing networking device 204 with another pre-configured networking device, and plugging antennas 206 and transceivers 208 to the new networking device. In contrast, when a custom remote station is deployed using existing components, one would need to first figure out which component of the base station is malfunctioning before any components can be repaired or replaced. It is not always clear which component is malfunctioning or underperforming, given that the base station may include a dedicated router, a dedicated switch, a local server, etc.).

Figure 2B:
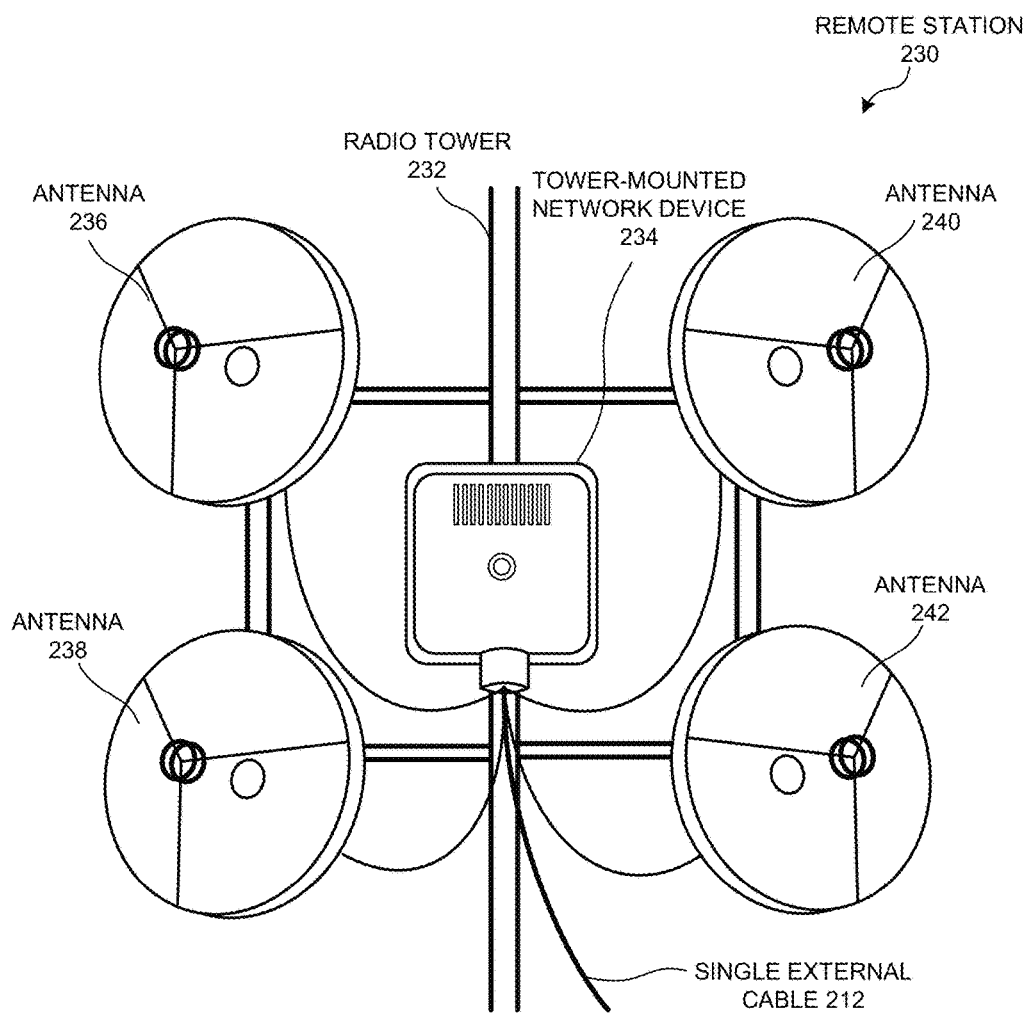
FIG. 2B illustrates a tower-mounted network device providing one power and data connection to a transceiver on each antenna mounted on a radio tower in accordance with an embodiment.

FIG. 2B illustrates a tower-mounted network device 234 providing one power and data connection to a transceiver on each antenna mounted on a radio tower 232 in accordance with an embodiment. Network device 234 can itself receive power from an external cable 212, such as a Power-over-Fiber line that carries power and data over a long distance. Using Power-over-Fiber to provide power and data to a network device via a single cable is described in U.S. patent application Ser. No. 14/197,896 (entitled "Hybrid Fiber Optic and Power over Ethernet," by inventors Ching-Yun Chien and Robert Pera, and filed 5 Mar. 2014), which is hereby incorporated by reference.

Because antennas 236, 238, 240, and 242 are in close proximity to network device 234, tower-mounted network device 234 can provide each power and data connection over a single Power-over-Ethernet (PoE) line that exits from a conduit port at a bottom portion of network device 234.

Figure 2C:
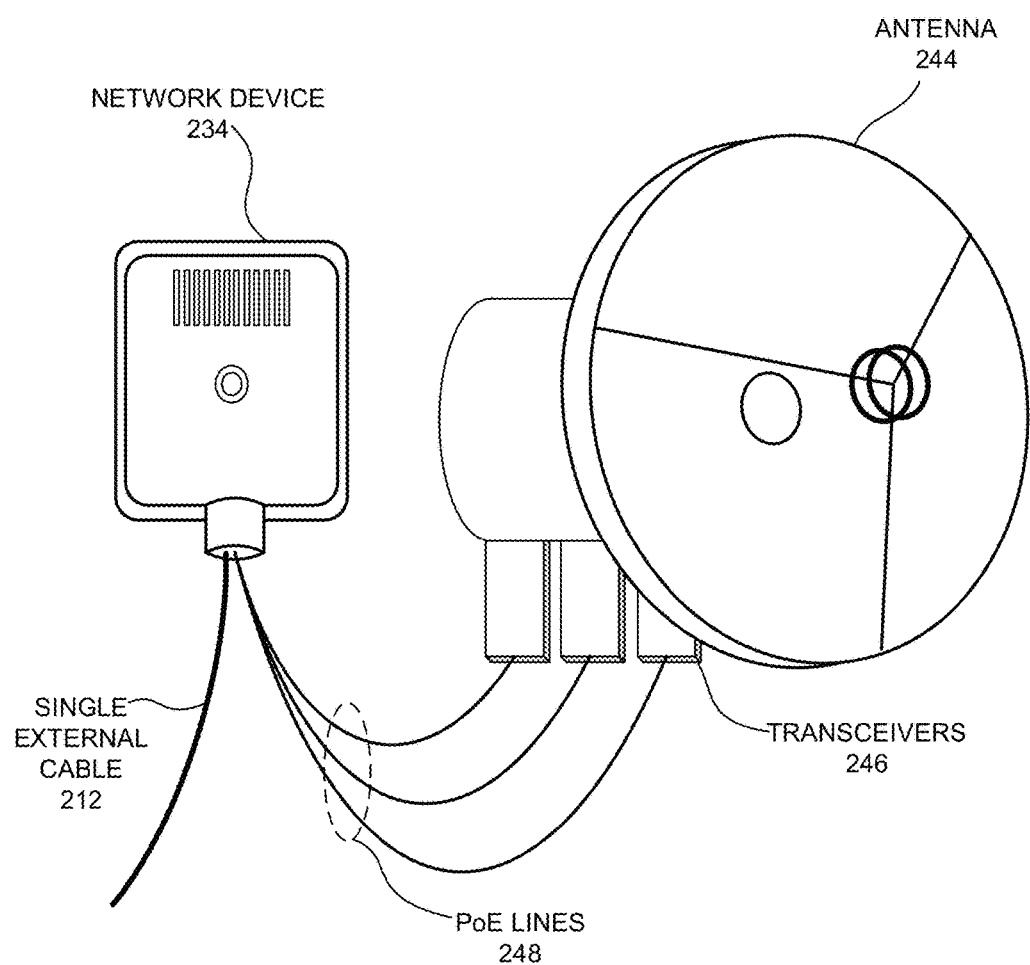
FIG. 2C illustrates a tower-mounted network device providing one power and data connection to each of multiple transceivers on one antenna in accordance with an embodiment.

FIG. 2C illustrates a tower-mounted network device 234 providing one power and data connection to each of multiple transceivers on one antenna in accordance with an embodiment. Specifically, antenna 244 can include a set of four transceivers 246 that each may send and/or receive data from a corresponding transceiver on a remote antenna. Using multiple transceivers on one antenna can effectively increase the data throughput of the antenna, but typically requires running multiple data and power lines up a tower. However, network device 234 can receive data and power from a single external cable 212, and can provide power and data to each transceiver on antenna 244 using a PoE line. The set of PoE lines 248 can be grouped together, and passed into a connection compartment via a downward-facing conduit port.

Networking Device Design

Figure 3A:
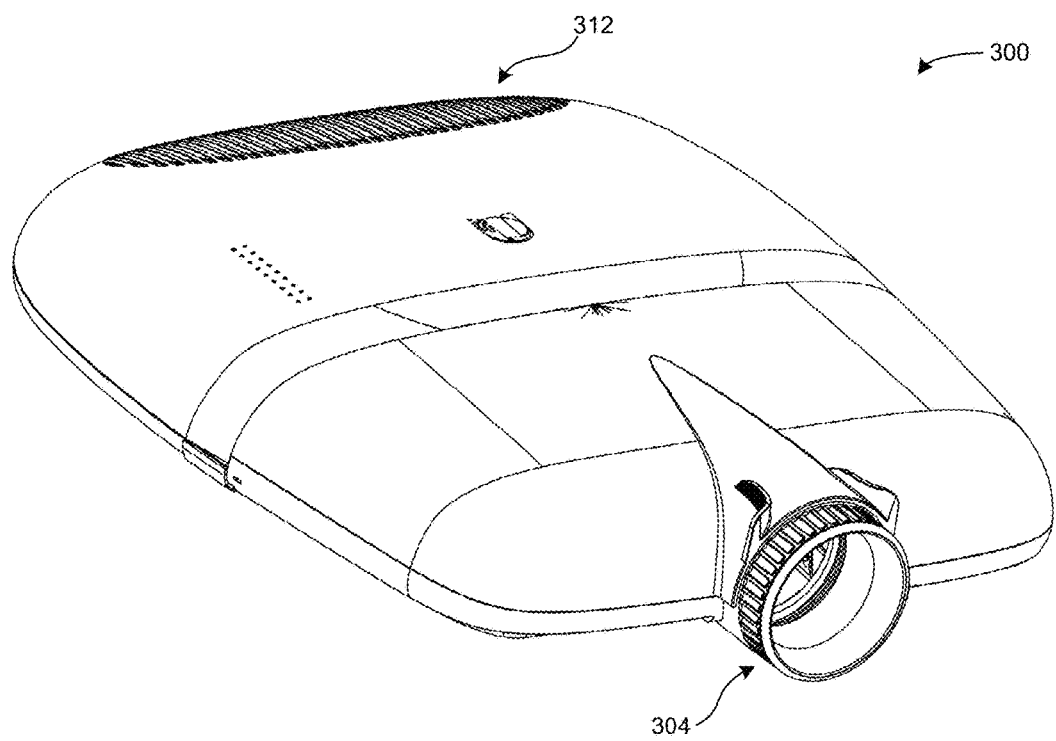
FIG. 3A illustrates a network device chassis in accordance with an embodiment.

FIG. 3A illustrates a chassis 300 for the networking device in accordance with an embodiment. Specifically, chassis 300 can include a front chassis coupled to a rear chassis (not shown) to house a weather-resistant printed circuit board (PCB) chamber. For example, chassis 300 can include a set of fins 312 without a vent to dissipate heat away from high-power electronics of an internal PCB, while protecting the cable connectors and the internal electronics from various environmental phenomenon such as rain, snow, dust, and sun heat. Also, a bottom-facing section of chassis 300 can include a port 304 for passing a set of cables to a connector panel.

In some embodiments, this port can include a conduit port that can be used to couple a conduit (e.g., an electrical conduit) to chassis 300, such as to pass the cables to the connector panel via the conduit. Alternatively, a conduit adapter can be used to hold one end of a sleeve against port 304, so that the remainder of the sleeve can close a gap between the cables and port 304 to prevent various environmental phenomenon from entering into the connector panel and/or the device circuitry.

FIG. 3B shows a front view of chassis 300 in accordance with an embodiment. Front chassis 300 includes a patch panel section 302 at a bottom section of front chassis 300 to prevent water (e.g., rain) from coming in contact with and settling on a set of cable connectors. Front chassis 300 also includes a set of heat-dissipating fins 312 near a top section of front chassis 300 to dissipate heat that radiates upward within the PCB chamber of the networking device. Front chassis 300 can also include a set of light-emitting diodes (LEDs) 314 that each indicates a status (e.g., a link status, a power status, etc.), and includes a logo 316 (e.g., a manufacturer logo, a product logo, etc.). For example, LEDs 314 can be arranged in a column of LED pairs, where a respective LED pair indicates a transmit status and receive status for a link.

In some embodiments, heat-dissipating fins 312 may not include vent openings that would dissipate air from inside of the networking device. Rather, heat-dissipating fins 312 include interdigitating sections of surface area that are elevated (or suppressed) relative to its two neighboring sections of surface area. Hence, heat-dissipating fins 312 provide additional surface area that improves the transfer of heat from the PCB chamber inside of networking device 300 to an environment external to networking device 300.

FIG. 3C illustrates a side profile of the networking device 300 in accordance with an embodiment. In some embodiments, the networking device 300 can have a center of gravity near a mounting bracket 320 affixed to networking device 300. Moreover, networking device 300 can have a height-to-depth ratio within a range [3:1, 4:1]. In some embodiments, networking device 300 can have a height-to-depth ratio of 13:4. This center of gravity near the mounting bracket, in combination with the narrow depth (relative to the height), for networking device 300 can make it easier for a technician to handle while mounting networking device 300 onto a hard-to-reach location such as a pole, a radio tower, a wall, a stadium ceiling, etc.

Figure 4:
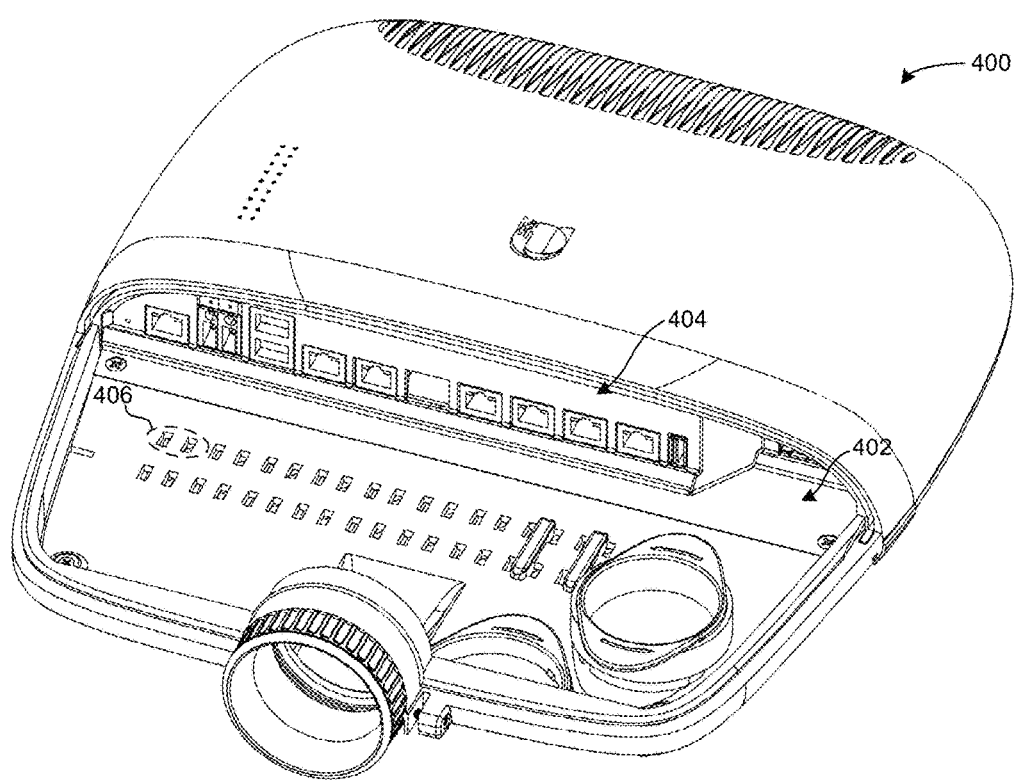
FIG. 4 illustrates an angled view of a networking device in accordance with an embodiment.

FIG. 4 illustrates an angled view of the networking device 400 in accordance with an embodiment. Specifically, the angled view reveals a patch panel section 402, and a patch panel 404 within patch panel section 402. In some embodiments, networking device 400 can include patch panel 404 at the bottom of networking device 400, facing downward to prevent water from settling on patch panel 404.

Patch panel section 402 can include a set of cable-fastener loops (e.g., loop 406), each loop comprising two openings along the surface of patch panel section 402 and an inner compartment that guides a cable fastener from one opening to the other.

Networking device 400 also includes a mounting bracket 406 that can be used to pole-mount the networking device, or to wall-mount the networking device. If networking device 400 is mounted on a pole of a radio tower, the network cables from patch panel 404 to the radio antennas can be kept at a minimum length, which minimizes the effects of radio frequency (RF) interference, and reduces a likelihood that a malicious entity would tamper with networking device 400 and/or its connections to the radio antennas.

Figure 5A:
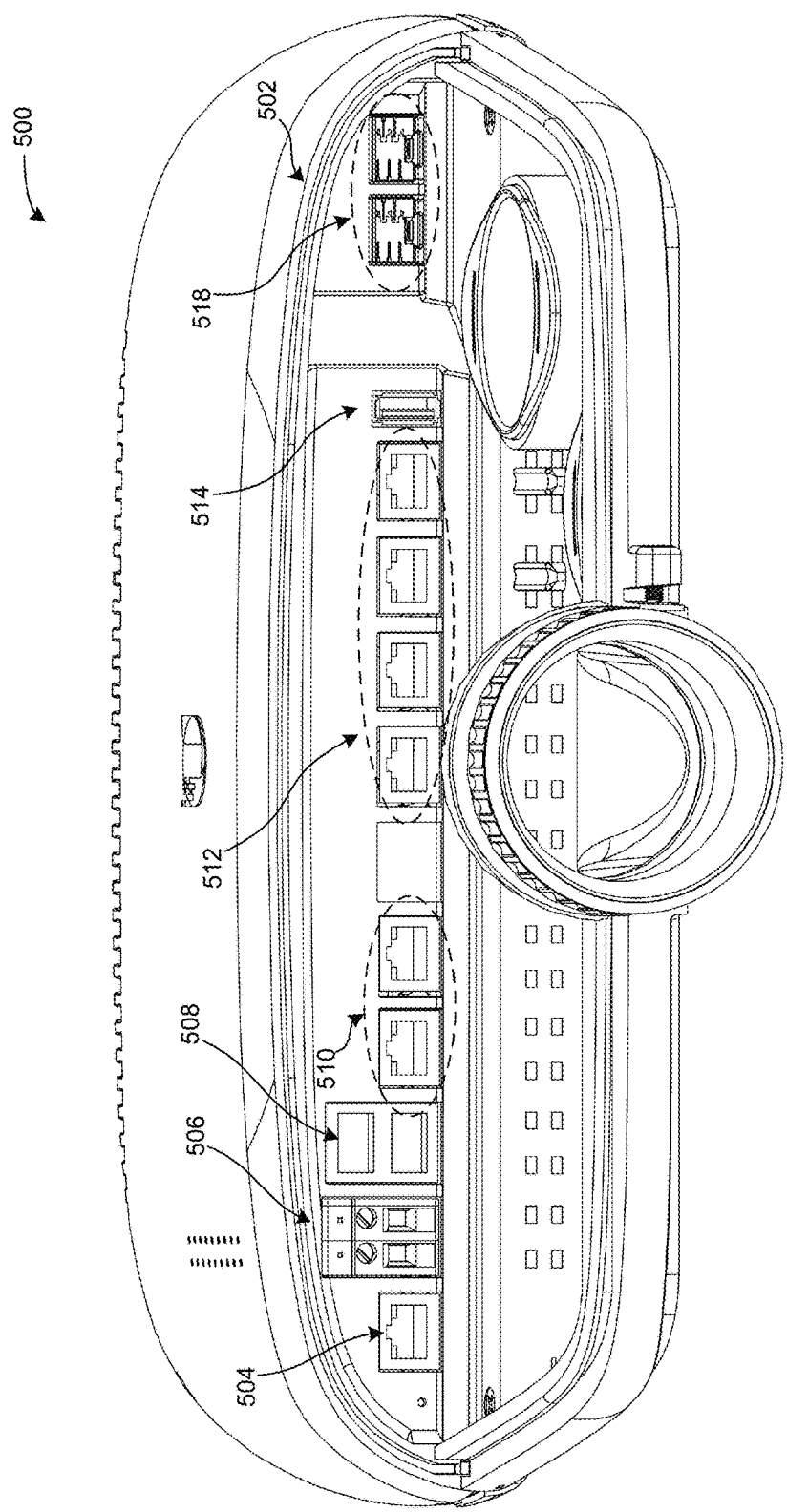
FIG. 5A illustrates a plurality of terminals accessible via a patch panel of a networking device in accordance with an embodiment.

FIG. 5A illustrates a plurality of terminals accessible via a patch panel 502 of networking device 500 in accordance with an embodiment. Patch panel 502 can include various terminals for receiving power, such as a 24 V terminal block 506, a set of Power over Ethernet (PoE) input ports 508, or a 50V terminal block. PoE input ports 508 can receive 50 V input power, or can receive 24 V input power.

In some embodiments, a primary power supply can be coupled to any power input terminal of networking device 500, such as by coupling a high wattage power supply to 24 V terminal block 506 or the 50 V terminal block, or by coupling a PoE adapter to a PoE input port 508. Moreover, a backup power supply can also be coupled to networking device 500, such as via 24 V terminal block 506 or an available PoE input port 508. For example, the backup power supply can include a battery supply and/or a solar panel, which can provide power to networking device 500 in the occasion that the primary power supply goes offline.

Patch panel 502 can also various terminals for sending and/or receiving data, such as a console interface 504, Power over Ethernet (PoE) input ports 508, a set of 50 V PoE output ports 510, a set of 24 V PoE output ports 512, a serial modem interface port 514, and a set of fiber optic ports 518. Serial modem interface port 514 can include a Universal Serial Bus (USB) port for establishing a network connection with a modem. Also, fiber optic ports 518 can include a fiber optic port for receiving data, and a second fiber optic port for sending data.

In some embodiments, console interface 504 can include any port for interfacing networking device 500 with a terminal computer. For example, console interface 504 can include a serial port (e.g., an RS-232 port, an Ethernet port, a USB port, etc.), or a parallel port.

Also, in some embodiments, networking device 500 can receive a network connection and power via a Power over Fiber cable. For example, the Power over Fiber cable can include a power cable that can be coupled to 24 V terminal block 506 or to the 50V terminal block, and can include two fiber optic cables (for full-duplex data transfer) that can be coupled to fiber optic ports 518.

Figure 5B:
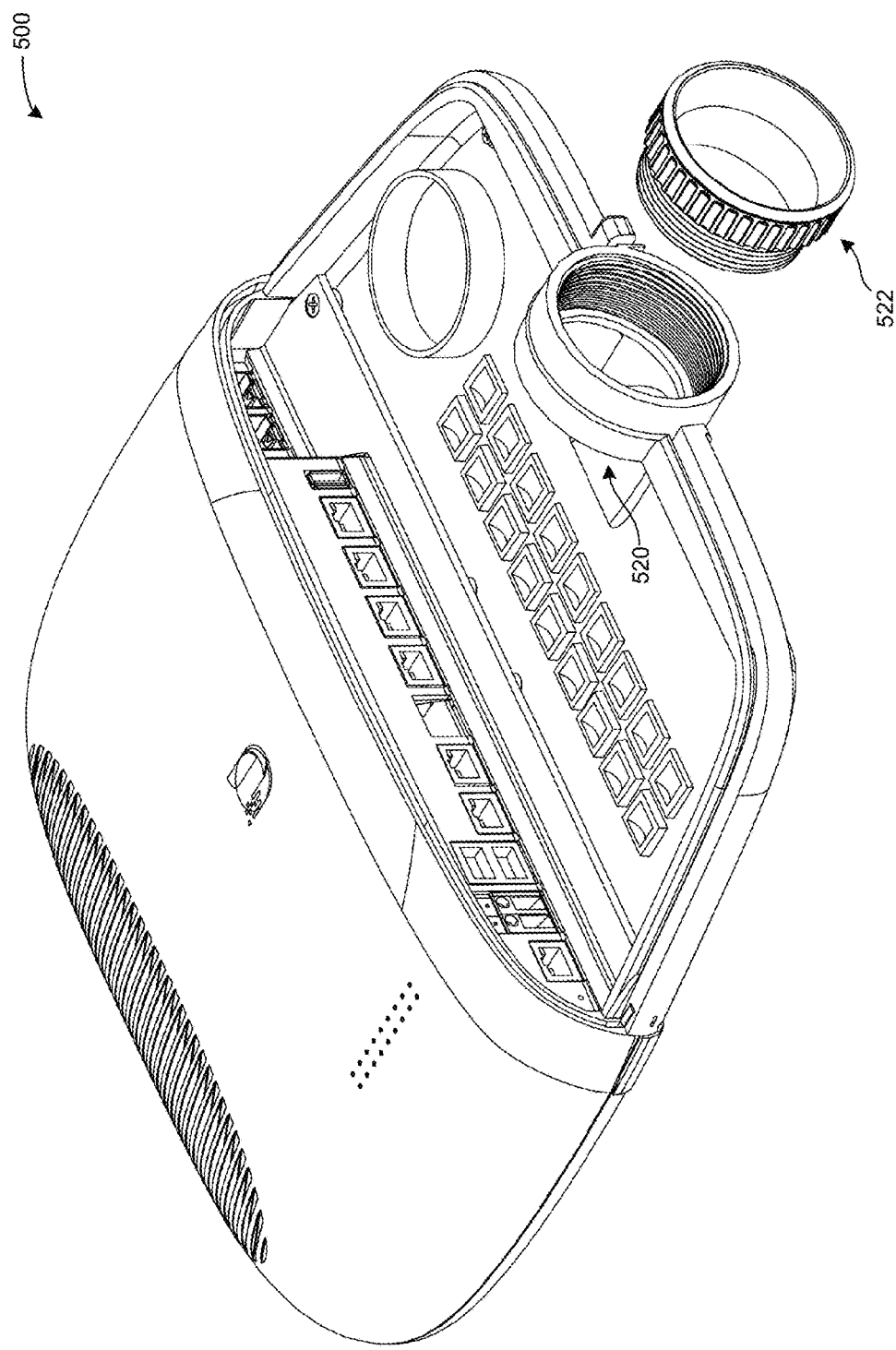
FIG. 5B illustrates a conduit port and a conduit adapter of a networking device in accordance with an embodiment.

FIG. 5B illustrates a conduit port 520 and a conduit adapter 522 of networking device 500 in accordance with an embodiment. Conduit port can include a threaded inner surface which allows a conduit with matching threads at one end to be coupled to conduit port 520. In some embodiments, a conduit adapter 522 may be pre-installed into conduit port 520, such as to protect the threaded inner surface of conduit port 520. If a custom electrical conduit is to be installed, a user can remove conduit adapter 522 from conduit port 520, and can install the custom electrical conduit to conduit port 520. A set of cables can then be passed through the conduit and into the connector compartment of networking device 500. However, if a custom conduit is not being used, conduit adapter 522 can be left coupled to conduit port 520.

When a front cover is installed to cover the connector compartment, the front cover and the conduit can prevent contaminants from an outside environment (e.g., water, dust, etc.) from entering into the connector compartment. The length of the custom conduit can be selected based on available space and the severity of the possible contaminants. Longer conduits can help prevent dust from entering into the connector compartment during strong winds, and can also prevent small rodents or birds from entering and nesting inside the connector compartment.

For example, conduit port 520 can include a threaded opening with a width and thread size that matches that of a standard pipe, such as a PVC pipe. Longer conduit pipes (e.g., 3 feet long or longer) can decrease the likelihood that water would enter into the connector compartment. A conduit pipe can also be used to prevent exposing cables to outdoor elements by running the pipe down a tower and underground or into a building or enclosure, such as to prevent the wires from being tampered with or severed by people or animals. Some conduits may be made of a rigid material (e.g., PVC, steel, copper, etc.). Other conduits may be made of flexible material (e.g., a silicone or flexible plastic material) that is easy for a technician to deploy around corners or along surfaces with varying angles or elevation. If network device 500 is used indoor, network device 500 can be mounted on a wall, and an angled conduit can be used to run the cables into the wall.

Figure 5C:
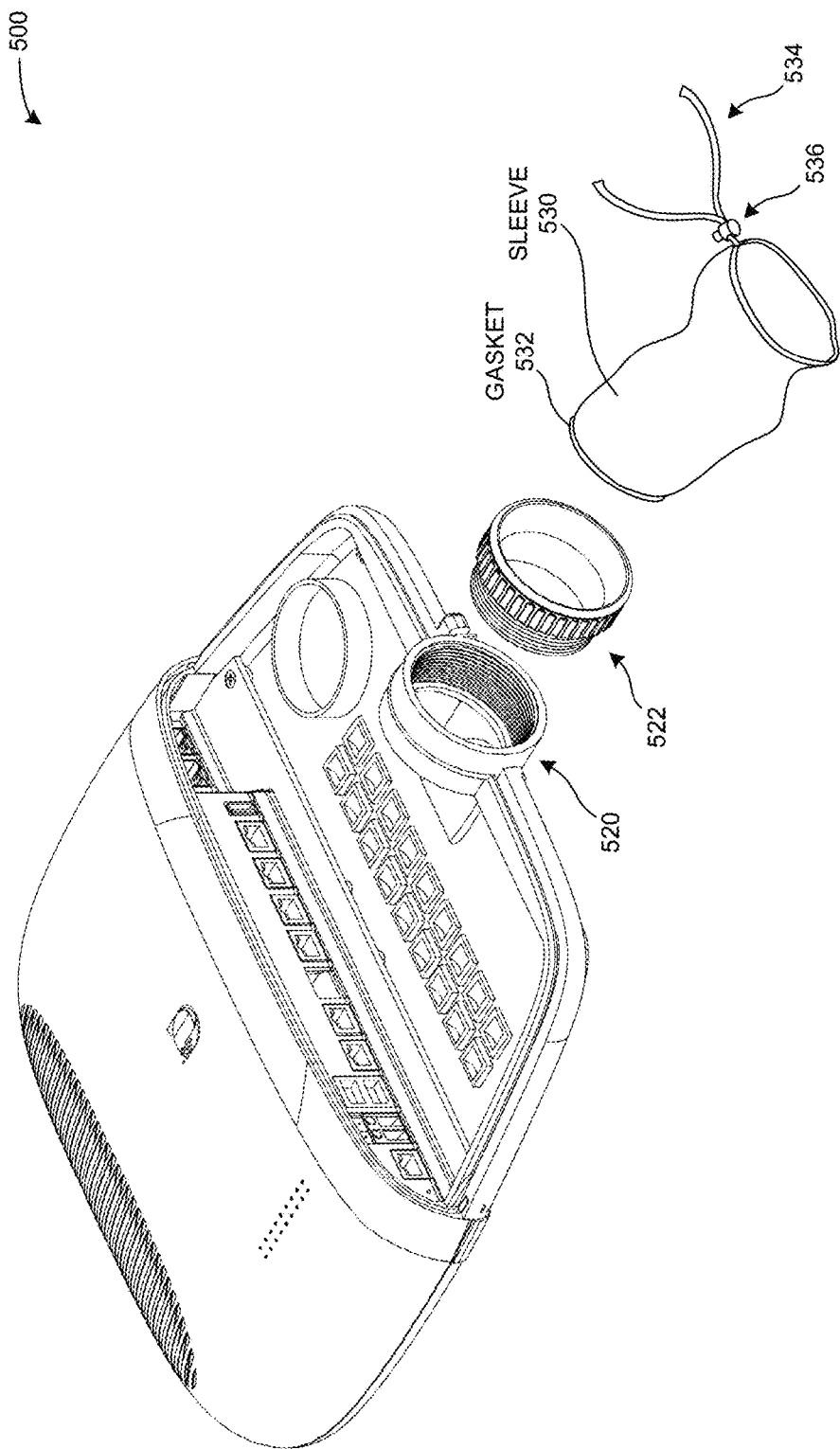
FIG. 5C illustrates an exemplary cable sleeve in accordance with an embodiment.

FIG. 5C illustrates an exemplary cable sleeve in accordance with an embodiment. Cable sleeve 530 can be made of weather-proof material that can prevent rain and dirt from entering into the connector compartment of network device 500. Specifically, sleeve 530 can include a gasket along one end, and an adjustable opening at an opposing end of sleeve 530. A user can reduce the radius of the adjustable opening to decrease a spacing between the adjustable opening and a set of cables passing through the adjustable opening.

In some embodiments, the conduit adapter can mate with conduit port 520. For example, the user can pass gasket 532 through conduit adapter 522 and into conduit port 520. Gasket 532 may rest against a side wall next to the threads of conduit port 520, so that when the user inserts conduit port 522, conduit adapter can cause gasket 532 to press against the side wall. Once conduit port 522 is substantially fastened to conduit port 520 (e.g., by screwing the threads of conduit adapter 522 along the threads of conduit port 520), gasket 532 and conduit adapter 522 create a weather-resistant seal against the side wall of conduit port 520. In some embodiments, this weather-resistant seal may be a hermetic seal that can prevent rain from entering into the connector compartment.

In some embodiments, gasket 532 can be made of rubber (e.g., flexible rubber, or hard rubber), or a stiff material (e.g., plastic, metal, a solid fibrous material, etc.), and may be embedded along the first end of sleeve 530. For example, gasket 532 may be held against sleeve 530 by a seam along the front end of sleeve 530. In a further embodiment, the seam can also be used to create a fold along the front end of sleeve 530 (e.g., a pleat that folds sleeve material back upon itself). The diameter of the front end and of the gasket may be sufficiently large to provide a tight seal against the inner diameter of conduit port 520.

Sleeve 530 can include a sleeve tightener along a rear end (e.g., along the adjustable opening), which allows the user to adjust the radius of the adjustable opening. For example, the sleeve-tightener can include a drawstring 534 that can tighten the adjustable opening of sleeve 530. This allows the user to increase or decrease the number of cables that run through conduit port 520 and sleeve 530, without affecting the waterproof abilities of sleeve 530. For example, a device that has breakaway ports may not allow the user to reseal a breakaway port once it has been used (e.g., uncovered). The unused and uncovered breakaway ports can leave an opening that is exposed to the external environment that may allow water to enter the connector compartment. If the user would want to cover the breakaway port, the technician may need to use a sealant to manually re-cover the breakaway port, which would require the technician to purchase the sealant, and could result in a messy seal that would make it difficult to re-use the port in the future.

Figure 5D:
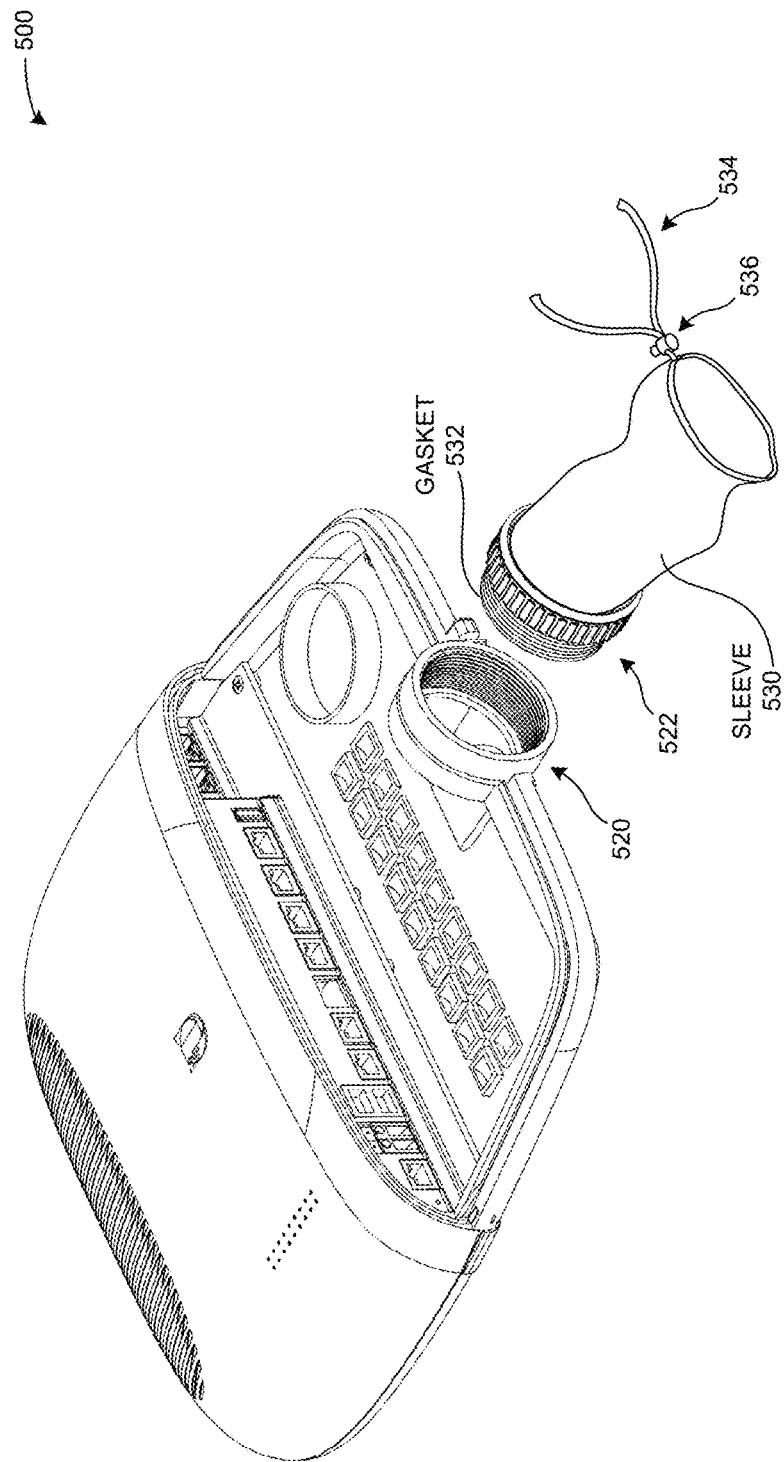
FIG. 5D illustrates an exemplary cable sleeve with a gasket adhered to a conduit adapter in accordance with an embodiment.

In some embodiments, sleeve 530 may be attached to conduit adapter 522. FIG. 5D illustrates an exemplary cable sleeve with a gasket adhered to a conduit adapter in accordance with an embodiment. Gasket 532 and one end of sleeve 530 may be adhered onto a front wall of conduit adapter 522, and the remainder of sleeve 530 may be passed through conduit adapter 522. Then, when conduit adapter 522 is screwed fully into conduit port 520, gasket 532 comes in contact with the side wall inside conduit port 520 to make a weather-resistant seal.

In some embodiments, gasket 532 can include a cross-section shape that can contour around the side perimeter of conduit adapter 522 to improve the seal between conduit adapter 522 and threaded port 520. For example, the cross-section shape can include an angled tube, so that one side of the angled tube is adhered to the front wall of conduit adapter 522. Also, the sleeve can be made of a water-resistant material, such as a neoprene material. In some embodiments, the sleeve's material can have a sponge-like or foam-like characteristic, which can fill in gaps between cables once the first end of the sleeve is tightened (e.g., using the sleeve-tightener).

Figure 5E:
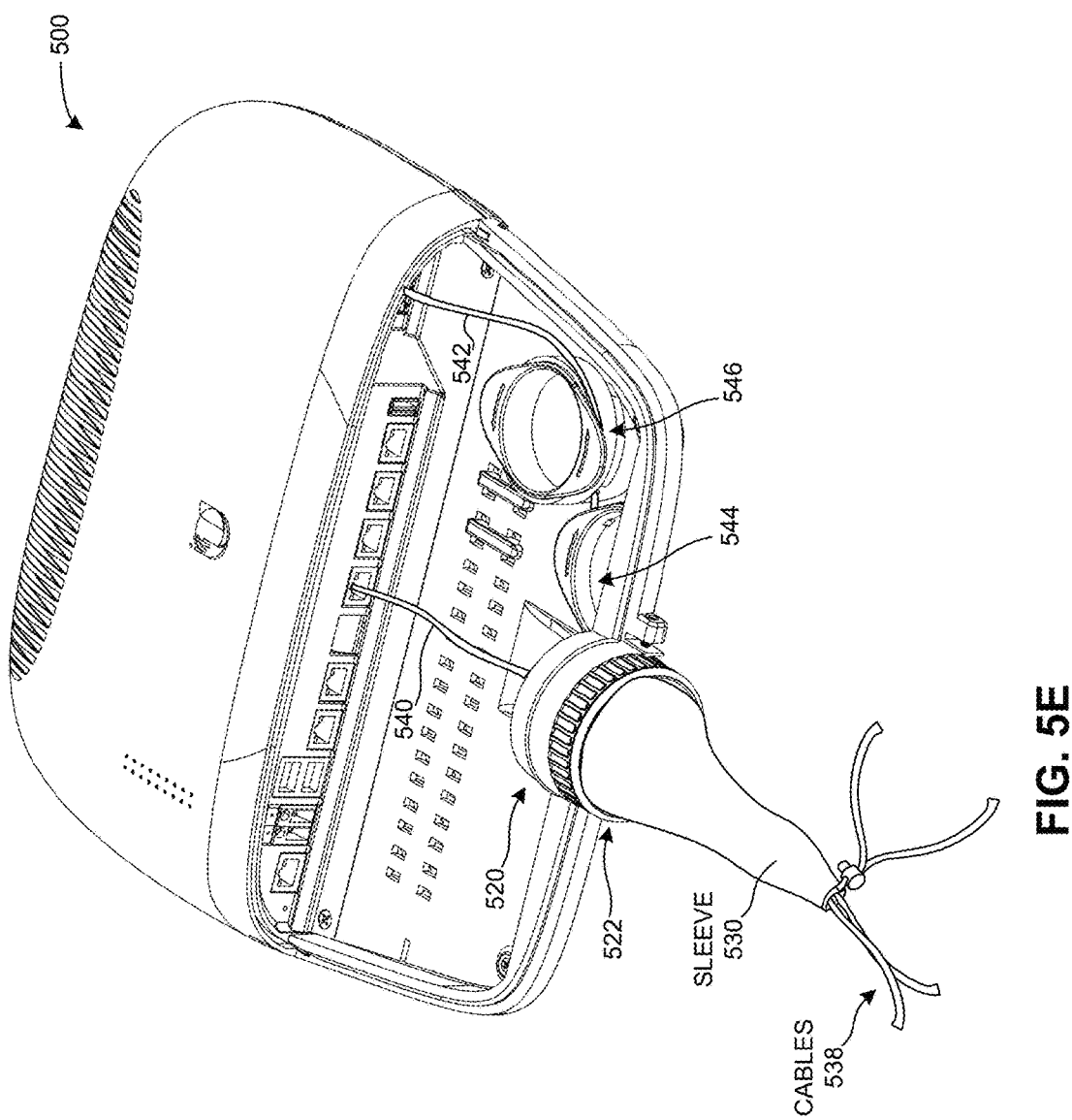
FIG. 5E illustrates an exemplary cable sleeve coupled to a conduit port in accordance with an embodiment.

FIG. 5E illustrates an exemplary cable sleeve coupled to a conduit port in accordance with an embodiment. Specifically, a set of cables 534 can pass through sleeve 530 and conduit port 520, and into a connector compartment of network device 500. For example, an Ethernet cable 540 can be coupled to a PoE port of network device 500. Also, optical fiber cable 542 can be passed through a strain-relief system that can safeguard cable 542 from breaking, and one end of cable 542 can be inserted into an optical fiber connector. The strain-relief system can include a strain-relief arc 544 that prevents an edge of conduit port 520 from breaking the optical fiber of cable 542, and can include a spool 546 for winding an unused length of cable prior to coupling optical fiber cable 542 to the optical fiber port. Arc 544 and spool 546 can each have a minimum radius that can prevent bending an optical fiber beyond a predetermined maximum angle to prevent breaking the optical fiber. In some embodiments, spool 546 can include a rubber band around its outer perimeter, which can prevent the optical fiber cable from slipping, either while the cable is being wound around spool 546 or while the cable is kept wound around spool 546.

When an access cover is mounted onto network device 500 to cover the connector compartment, the access cover becomes in contact with the outer perimeter of conduit port 520, without disrupting a set of cables passing through conduit port 520. A user can also remove the access cover without disturbing cables 538 that are connected to the port connectors inside the connector compartment.

In some embodiments, sleeve 530 can be unfastened along one side to unwrap from cables 538, such as by undoing a fastener along the side. This can provide a simple way to remove sleeve 530 without having to disconnect cables 538 from their respective ports. Moreover, if sleeve 530 is to be installed at a later time, sleeve 530 can be wrapped around cables 538, and then fastened along one side to form an enclosure around the cables. Sleeve 530 can then be inserted into conduit port 520, followed by inserting and fastening conduit adapter 522 into the conduit port.

FIG. 5F illustrates an exemplary cable sleeve being wrapped or unwrapped from a set of cables in accordance with an embodiment. The sleeve's side fastener can be made of bonded zippers with weatherproof edging, or can be made of a hook-and-loop fastener (e.g., Velcro), or any water-resistant reversible fastener now known or later developed. Also, gasket 532 can be open-ended, so that when the sleeve's fastener is closed, gasket 532 also becomes closed to form a loop with tight water-resistant contact between the two ends. In some embodiments, the sleeve-tightener may include a cordlock 536, or any type of removable drawstring fastener now known or later developed. Two ends of drawstring 534 can be inserted into cordlock 536 to tighten the distal end of sleeve 530. Also, the two ends of drawstring 534 can be removed from cordlock 536 when the sleeve's side fastener is undone to completely unwrap and remove sleeve 530 from a set of cables.

Figure 5G:
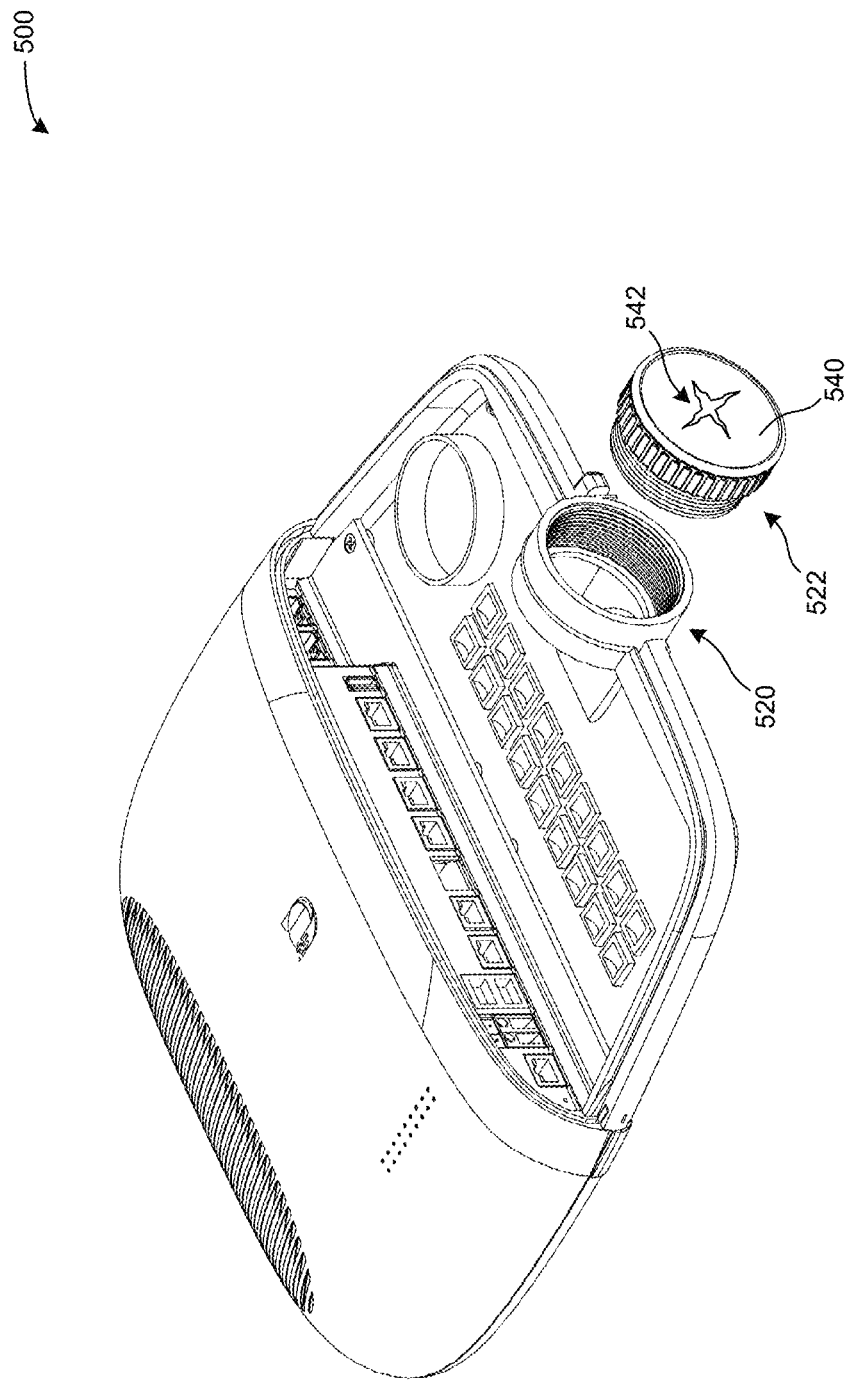
FIG. 5G illustrates an exemplary conduit adapter 522 with a membrane 540 at a distal end in accordance with an embodiment.

In some embodiments, instead of or in addition to having a sleeve, conduit adapter 522 can include a membrane with a center gap or hole for passing a set of cables. FIG. 5G illustrates an exemplary conduit adapter 522 with a membrane 540 at a distal end in accordance with an embodiment. The user can create a gap 542 with a gap size that accommodates the number of cables that are to be passed through the conduit adapter, without leaving a significant amount of additional empty space between gap 542 and the cables. For example, membrane 540 can be on the distal end or on the proximal end of conduit adapter 522. Also, gap 542 may initially have a size suitable for passing one or more cables, but may be made larger (e.g., by cutting membrane 540 to extend gap 542) as additional cables are passed through membrane 540.

In a further embodiment, a technician may also insert a sealant into conduit adapter 522 to seal gaps between the cables and the inner walls of conduit adapter 522. The sealant may be used in addition to sleeve 530 and/or membrane 540, such as by inserting the sealant into conduit adapter 522 from inside the connector compartment (e.g., from the proximal end of conduit port 520). If a sleeve is used along with conduit adapter 522, the sealant may rest on a top surface of the sleeve (e.g., the inner sleeve surface), so that the sleeve behaves as a cup for the sealant. Alternatively, if the distal end of conduit adapter 522 comprises a membrane, the sealant may rest on a top surface of the membrane. In some embodiments, the sealant may include a non-conductive foam or gel, such as a silicone-based foam or gel.

Figure 6A:
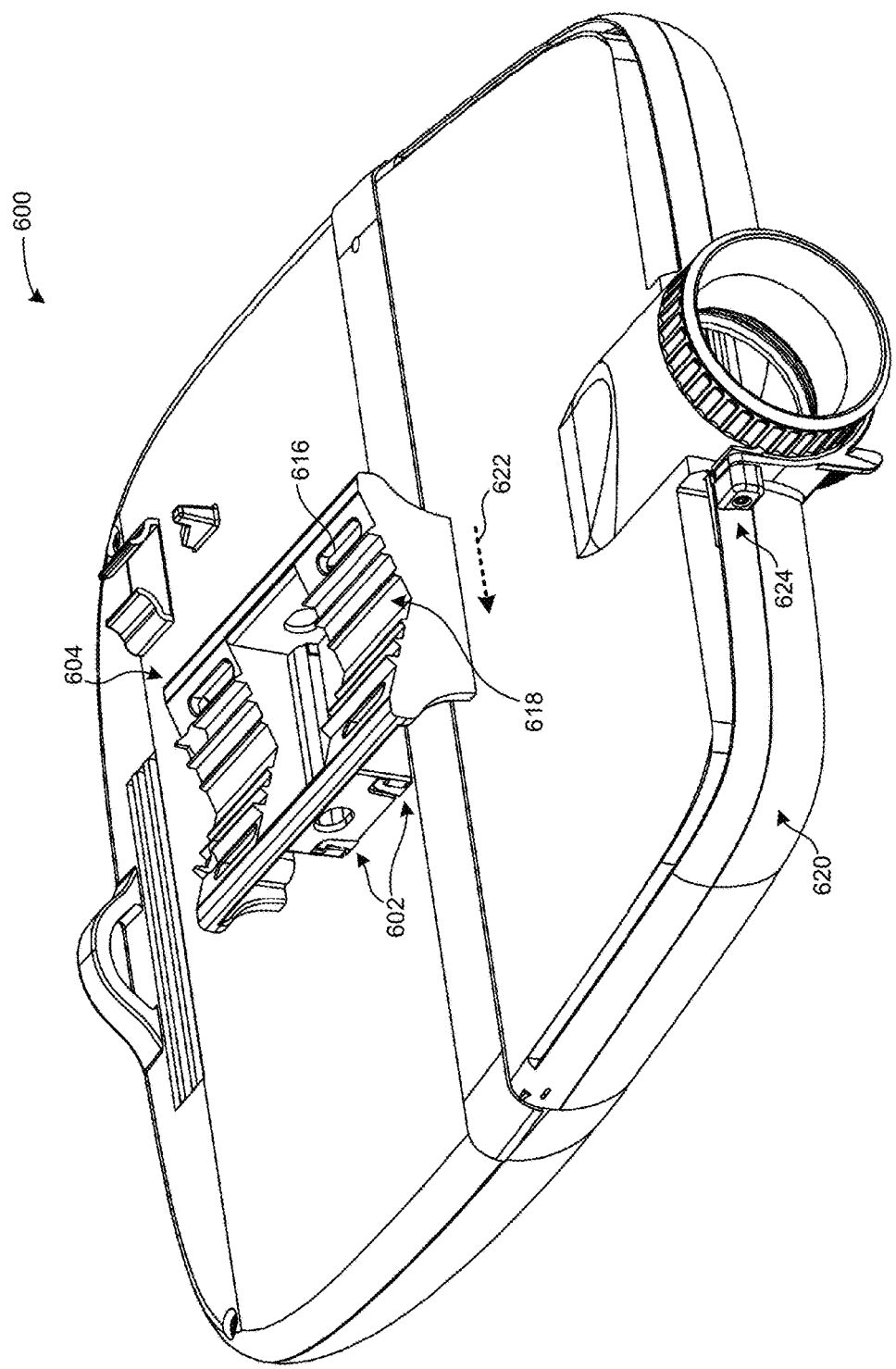
FIG. 6A illustrates a mounting bracket for a networking device 600 in accordance with an embodiment.

FIG. 6A illustrates a mounting bracket 604 of the networking device 600 in accordance with an embodiment. Mounting bracket 604 can be used to mount the networking device on a pole or on a wall surface. When mounting the networking device on a pole or wall surface, the user can first install mounting bracket 604 to the desired surface. Then, the user can insert rails 602 of networking device 600 into mounting bracket 604.

Mounting bracket 604 can include a set of mounting holes (e.g., hole 616) for fastening mounting bracket 604 to a wall surface using a set of screws. Mounting bracket 604 can also include a curved surface 618, which facilitates fastening mounting bracket 604 to a pole. For example, the user can place mounting bracket 604 against a pole so that the pole is pressed against curved surface 618, and can fasten a second pole-mounting bracket (not shown) to mounting bracket 604 by inserting and tightening a set of bolts against the mounting holes.

In some embodiments, networking device 600 can include a bracket locking mechanism that can fasten and lock mounting bracket 604 to networking device 600. For example, the user can insert screws from inside networking device 600, which fasten mounting bracket 604 to networking device 600. To remove networking device 600 from mounting bracket 604, the user needs to remove a front panel 620 from networking device 600, unscrew and remove the screws from within the connector compartment, and slide networking device 600 along direction 622.

In some embodiments, front panel 620 can be fastened to a rear chassis of networking device 600 by a locking mechanism 624, such as a screw. If the user wants to gain access to the patch panel or to unmount networking device from mounting bracket 604, the user needs to first remove front panel 620 by disengaging (e.g., unscrewing) locking mechanism 624.

Figure 6B:
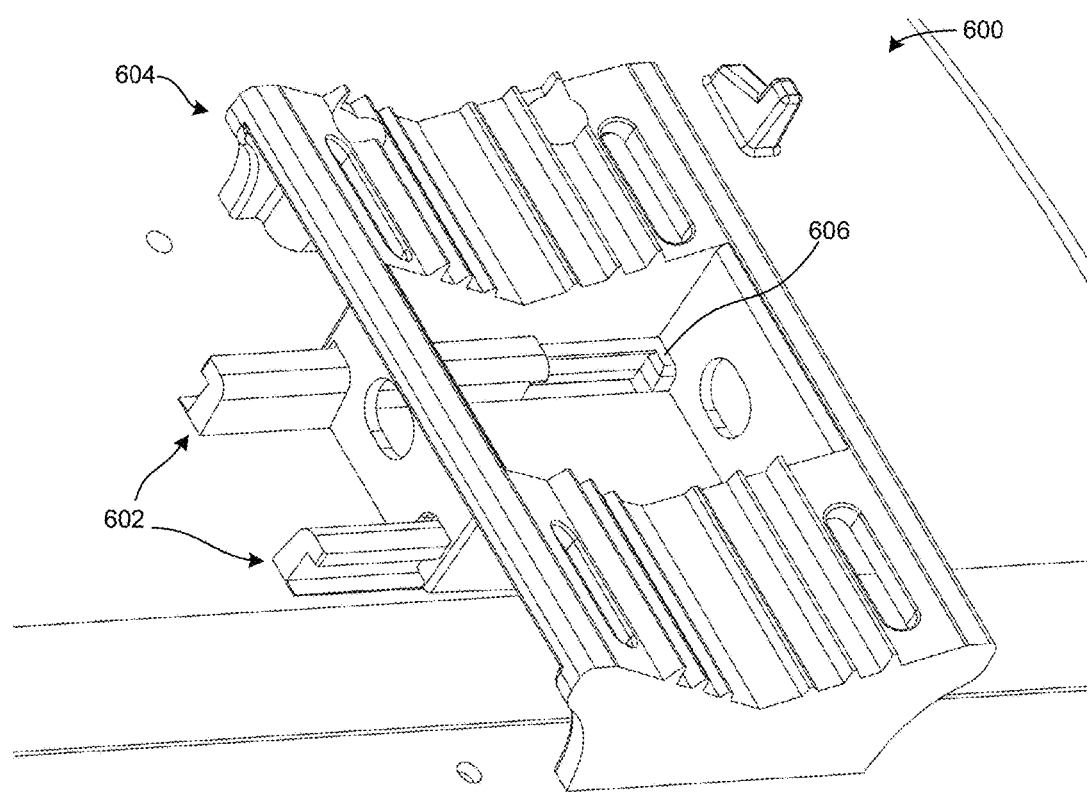
FIG. 6B illustrates a set of rails on a networking device partially inserted into a mounting bracket in accordance with an embodiment.

FIG. 6B illustrates a set of rails 602 of networking device 600 partially inserted into mounting bracket 604 in accordance with an embodiment. Specifically, rails 602 can slide into mounting bracket 604 until rails 602 make contact with a side wall 606 of mounting bracket 604.

Figure 7:
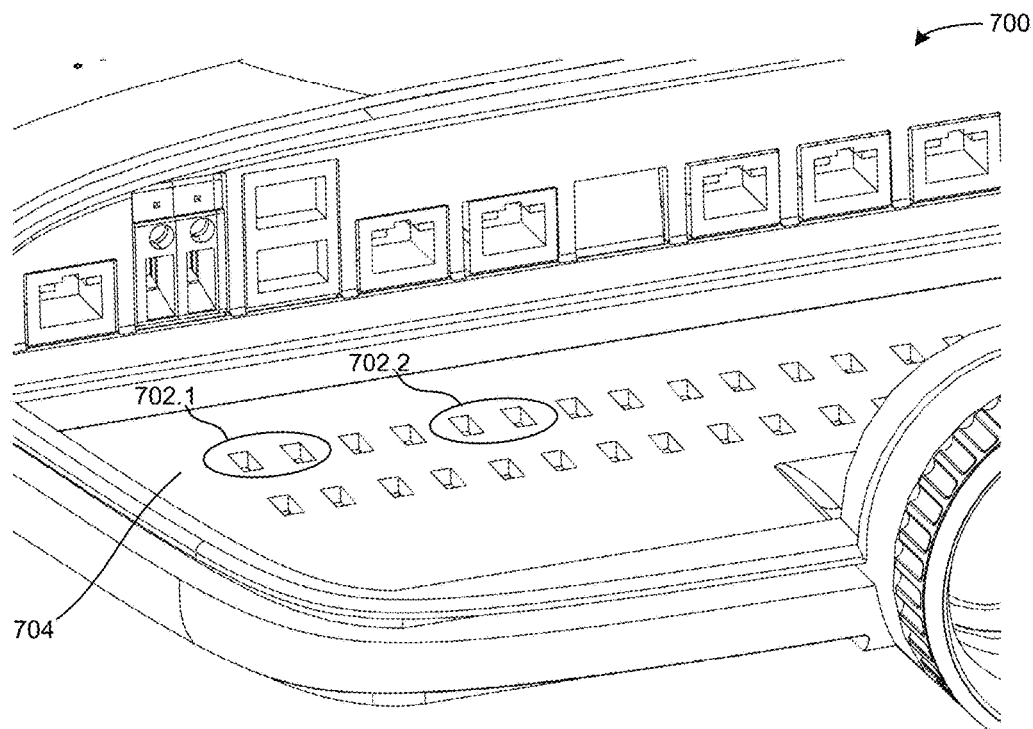
FIG. 7 illustrates a set of cable-fastener loops on a compartment surface of a networking device in accordance with an embodiment.

FIG. 7 illustrates a set of cable-fastener loops 702.1 and 702.2 on a compartment surface 704 of networking device 700 in accordance with an embodiment. Specifically, cable-fastener loop 702.1 can includes two openings for looping a cable fastener (e.g., a cable tie) into a first opening and out of a second opening of cable-fastener loop 702.1. Also, cable-fastener loop 702.1 can include a curved surface underneath the two openings, which guides the cable fastener from one opening to the other opening.

Figure 8:
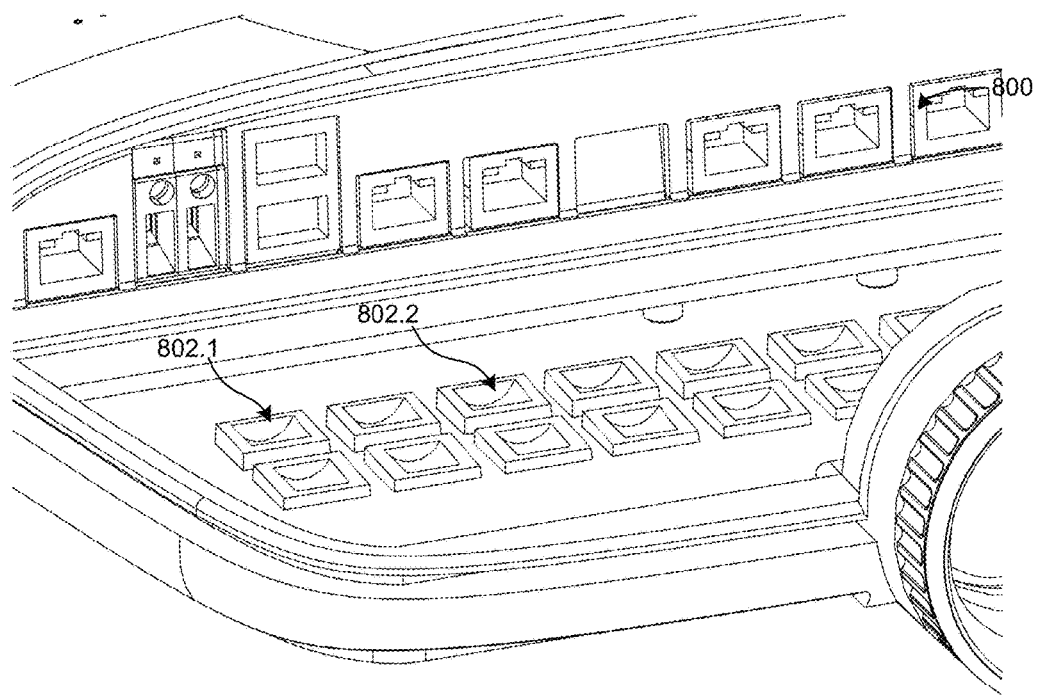
FIG. 8 illustrates curved surfaces underneath cable-fastener loops of networking device 800 in accordance with an embodiment.

FIG. 8 illustrates curved surfaces 802.1 and 802.2 underneath the cable-fastener loops of networking device 800 in accordance with an embodiment. The curved surfaces reside below the compartment surface of networking device 800, so that each curved surface is below a pair of openings that form a cable-fastener loop on the compartment surface. Specifically, a curved surface 802.1 can guide a cable fastener from one opening of a cable-fastener loop to a neighboring opening.

Figure 9A:
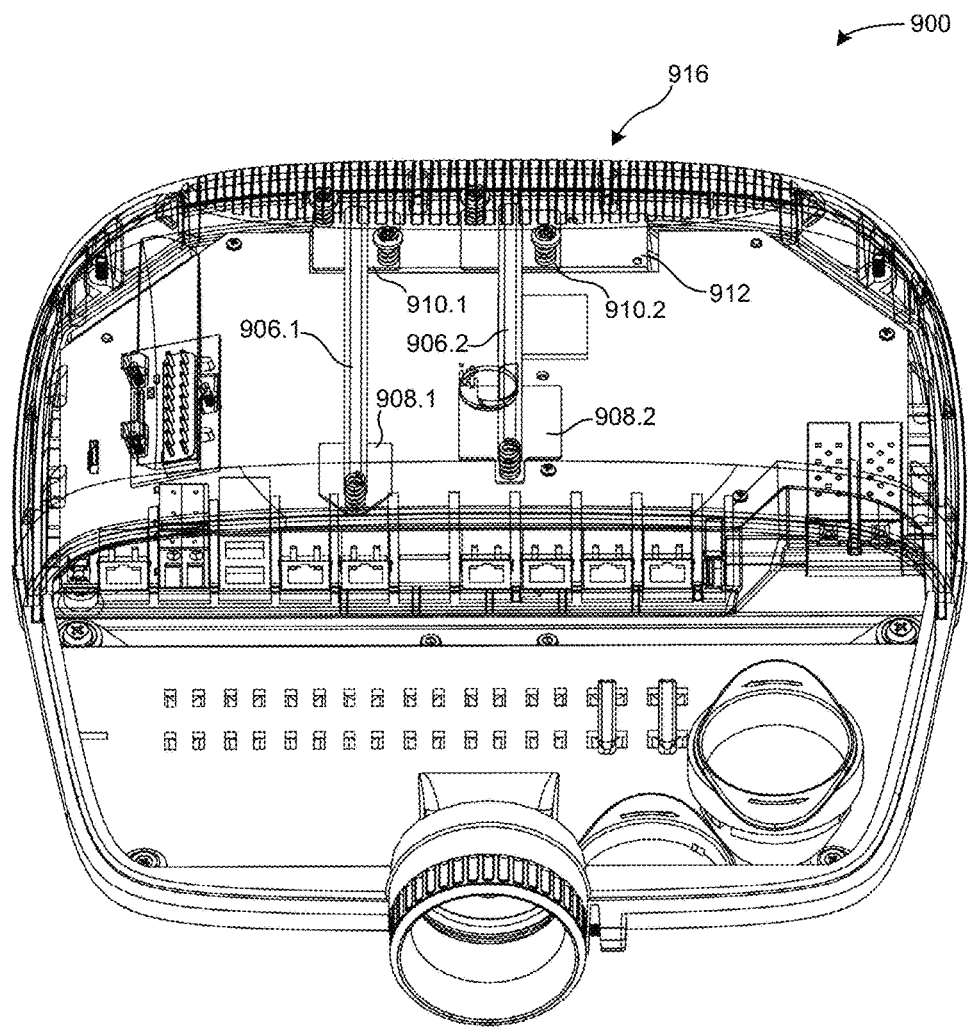
FIG. 9A illustrates a networking device with a multiple heat pipe configuration in accordance with an embodiment.

FIG. 9A illustrates a networking device 900 exposing a multiple heat pipe configuration in accordance with an embodiment. Specifically, the multiple heat pipe configuration can include a heat pipe 906.1 coupled to a heat sink 912, as well as a second heat pipe 906.2 coupled to the same heat sink 912. Each heat pipe can include a plate at one end (e.g., plate 908.2) that sources heat from a heat source (e.g., a circuit element), and includes a plate at an opposing end of the heat pipe (e.g., plate 910.2) that dissipates the heat to heat sink 912. In some embodiments, the heat source can include a communications microchip, a microprocessor, a power transistor, and/or a signal-amplifying microchip. Moreover, in some embodiments, networking device 900 can include a network router.

The heat pipe can include a tube comprising a thermally conductive surface, and filled with a fluid that transfers heat along the heat pipe. The heat pipe channels heat from the heat source to heat sink 912 as the fluid evaporates when heated by the heat source and condenses when cooled by the heat sink. Also, heat sink 912 can be oriented at a top portion of networking device 900, and in close proximity to a set of heat-dissipating fins 916 along a front chassis of networking device 900. The top orientation of heat sink 912 can dissipate heat from a heat source that travels upward via the heat pipe coupled to the heat source. Similarly, the top orientation of heat-dissipating fins 916 can dissipate heat from the heat source, which is transferred upward toward the top of networking device 900 by the air inside networking device 900.

In some embodiments, heat sink 912 can include a set of screw holes for mounting an additional heat pipe. The additional heat pipe can transfer heat from an existing heat source of networking device 900, or from a heat source that is added to networking device 900 at a later time.

Figure 9B:
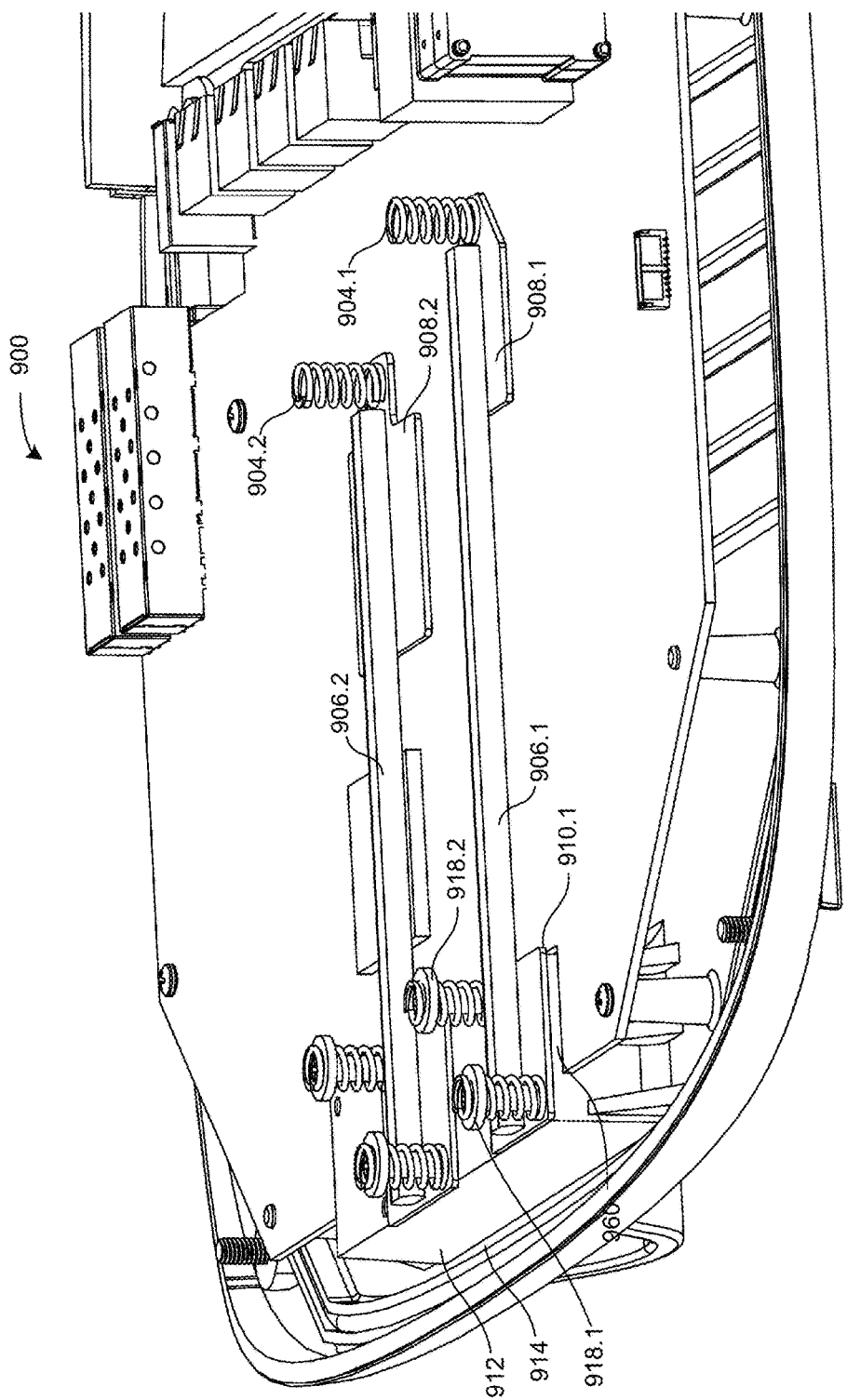
FIG. 9B illustrates an angled side view of a heat pipes mounted on a heat sink in accordance with an embodiment.

FIG. 9B illustrates an angled side view of the heat pipes 906.1 and 906.2 mounted on heat sink 912 of networking device 900 in accordance with an embodiment. Specifically, heat pipe 906.1 can include a plate 908.1 pressed against heat source (not shown) by a spring screw 904.1, and includes a plate 910.1 pressed against heat sink 912 by spring screws 918.1 and 918.2. Heat sink 912 can include any thermal-conductive material, such as aluminum.

In some embodiments, a spring screw may include a screw that can be tightened into a standoff on the networking device's motherboard. The spring screw may also include a coil spring which can push against the screw head and plate 908.1 when the screw is screwed into and tightened in the standoff. The standoff can produce a consistent distance between the screw's head and the motherboard. Given that the distance from the screw head and the motherboard is constant, the force at which plate 908.1 presses against the heat source is governed by the force exerted by the compression coil spring used in spring screw 904.1.

In some embodiments, plate 908.1 of heat pipe 906.1 may be pressed against the heat source by a screw without a spring, and plate 910.1 of heat pipe 906.1 may be pressed against heat sink 912 by additional screws without springs.

Figure 10:
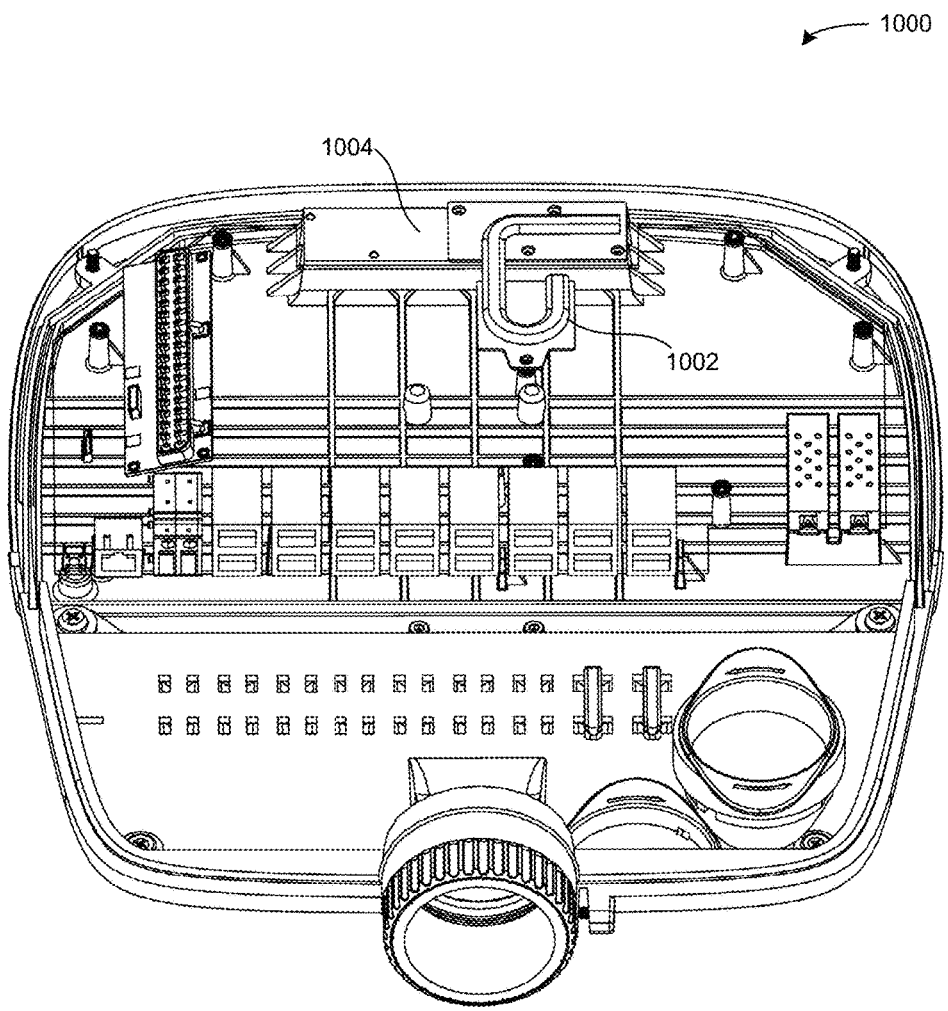
FIG. 10 illustrates a networking device exposing a single heat pipe configuration in accordance with an embodiment.

FIG. 10 illustrates a networking device 1000 exposing a single heat pipe configuration in accordance with an embodiment. Specifically, the heat pipe configuration can include a heat pipe 1002 coupled to a heat sink 1004. Heat pipe 1002 can include a curved shape that runs near a portion of a perimeter of a heat source to increase the thermal contact between heat pipe 1002 and the heat source. The increased thermal contact can improve the efficiency at which heat pipe 1002 moves heat away from the heat source, and onto heat sink 1004. In some embodiments, the heat source can include a communications microchip, a microprocessor, a power transistor, and/or a signal-amplifying microchip. Moreover, networking device 1000 can include a network switch.

In some embodiments, the rear chassis section of the networking device can include a set of heat-dissipating fins, which can be in thermal contact with a heat sink inside the networking device. The heat-dissipating fins can transfer heat away from the heat sink and onto an environment external to the networking device.

Figure 11:
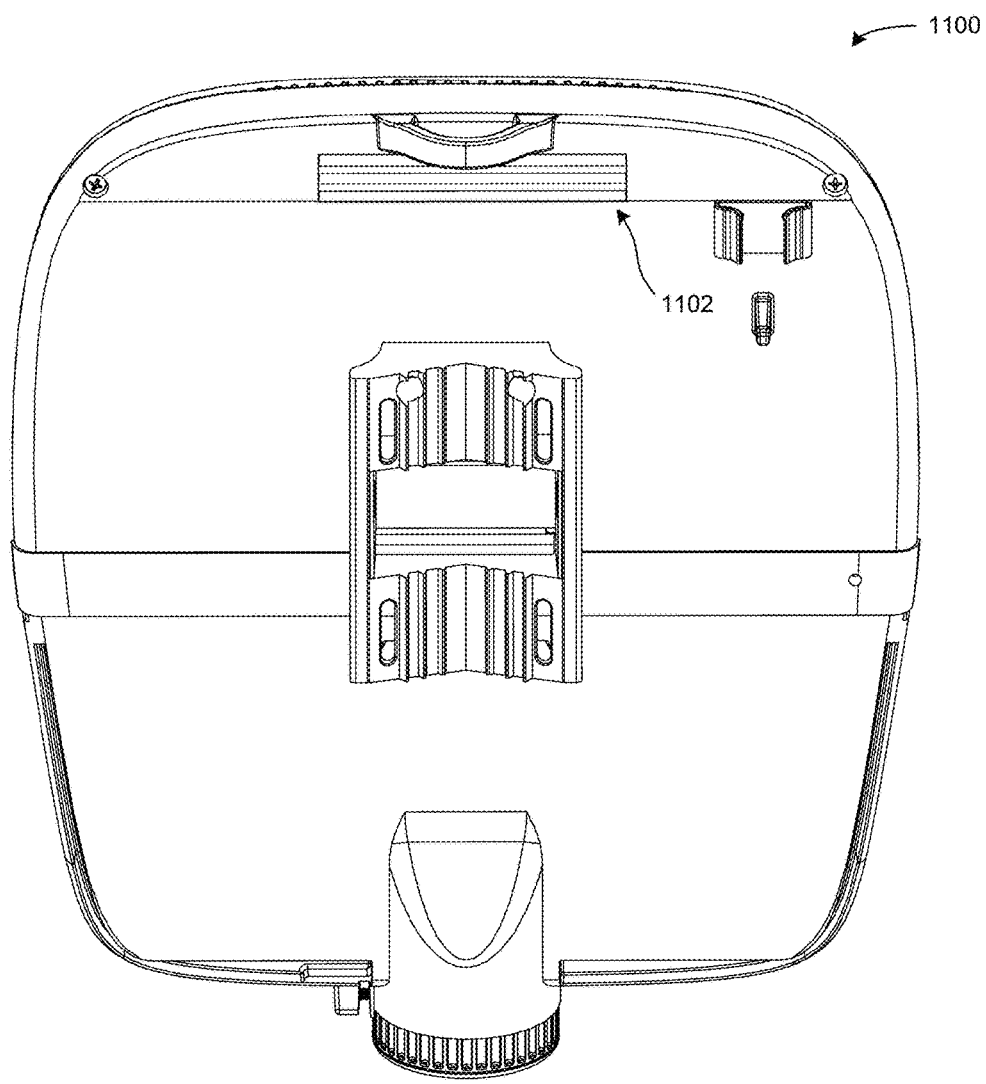
FIG. 11 illustrates a set of heat-dissipating fins of a networking device 1100 in accordance with an embodiment.

FIG. 11 illustrates a set of heat-dissipating fins 1102 of a networking device 1100 in accordance with an embodiment. Heat-dissipating fins 1102 are oriented along a top portion of networking device 1100, on a rear chassis section of networking device 1100. Heat-dissipating fins 1102 may be in thermal contact with a heat sink of networking device 1100, and can transfer heat away from the heat sink onto an environment external to networking device 1100.

Specifically, heat-dissipating fins 1102 may not include vent openings that would dissipate air from inside of networking device 1100. Rather, heat-dissipating fins 1102 include interdigitating sections of surface area that are elevated (or suppressed) relative to its two neighboring sections of surface area. Hence, heat-dissipating fins 1102 provide additional surface area that improves the transfer of heat to an environment external to networking device 1100.

Figure 12:
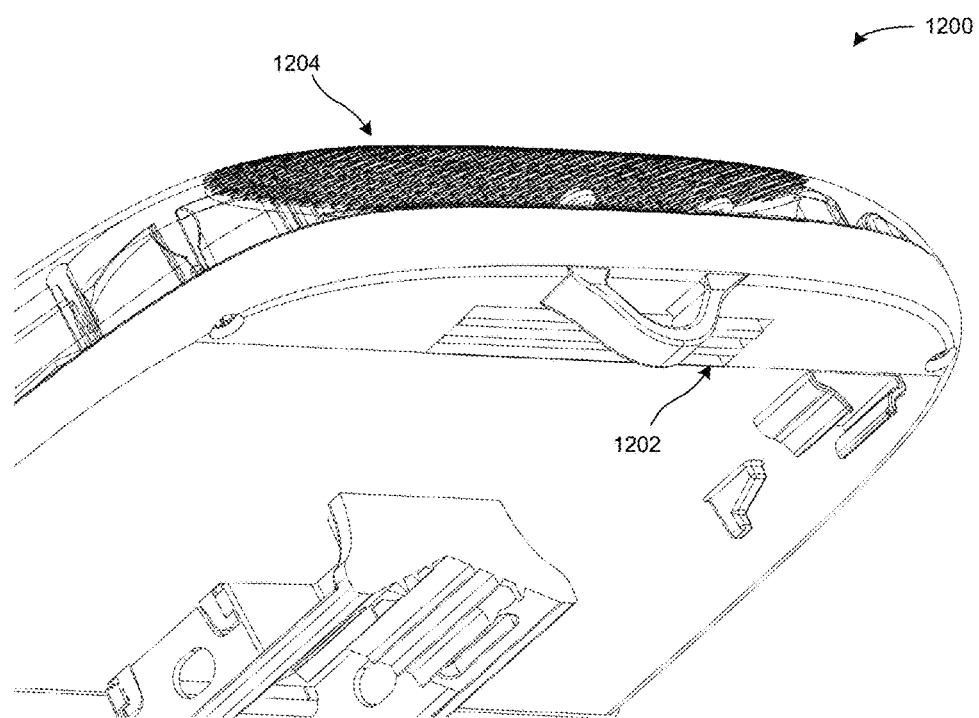
FIG. 12 illustrates a close-up angled view of heat-dissipating fins on a rear surface of a networking device in accordance with an embodiment.

FIG. 12 illustrates a close-up angled view of heat-dissipating fins 1202 on a rear surface of a networking device 1200 in accordance with an embodiment. FIG. 12 also illustrates another set of heat-dissipating fins 1204 on a front surface of networking device 1200. In some embodiments, heat-dissipating fins 1202 and 1204 may each be substantially parallel to a heat sink inside networking device 1200, and at opposing sides of the heat sink. For example, heat-dissipating fins 1202 and 1204, as well as the heat sink, may reside on a top section of networking device, which allows heat to rise toward the heat sink and to heat-dissipating fins 1202 and 1204. Heat-dissipating fins 1202 may be in thermal contact with the heat sink, and may dissipate heat away from the heat sink via the thermal contact. Heat-dissipating fins 1204, on the other hand, may dissipate heat away from the heated air inside a top section of networking device 1200.

Mini Networking Device

In some embodiments, the networking device can be implemented in a small form factor for radio towers that include a few low-power antennas.

Figure 13:
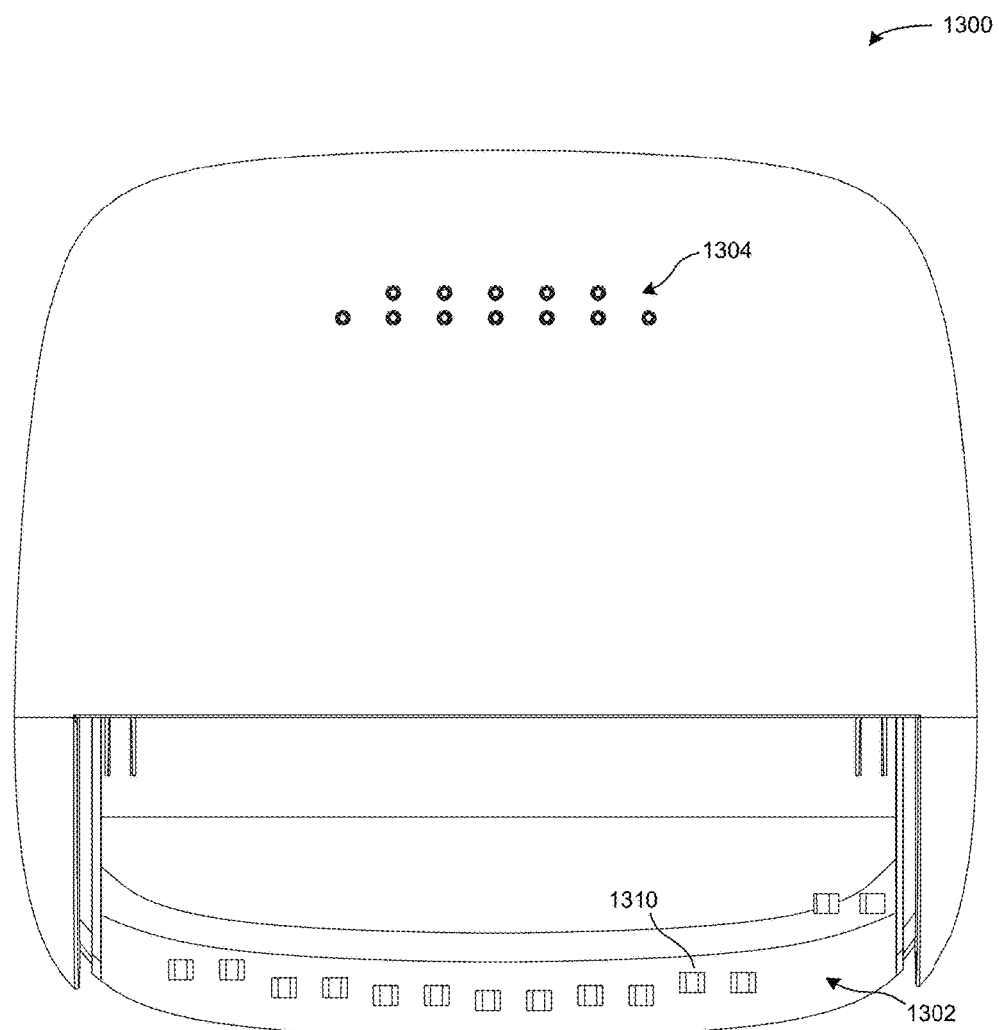
FIG. 13 illustrates a front-chassis for a low-power networking device in accordance with an embodiment.

FIG. 13 illustrates a front-chassis 1300 for a low-power networking device in accordance with an embodiment. Specifically, front-chassis 1300 is coupled to a rear chassis (not shown) to house a printed circuit board (PCB) chamber. Front-chassis 1300 is resistant to weather intrusion to protect the cable connectors and the internal electronics from various weather phenomena such as rain, snow, and sun heat.

Front chassis 1300 includes a patch panel section 1302 at a bottom section of front chassis 1300 to prevent water or rain from coming in contact with and settling on a set of cable connectors. In some embodiments, front chassis 1300 for the low-power networking device does not need to include a vent or a set of heat-dissipating fins to dissipate heat from inside the PCB chamber of the networking device. Front chassis 1300 can include a set of light-emitting diodes (LEDs) 1304 that each indicates a status (e.g., a link status, a power status, etc.), and includes a logo 1306 (e.g., a manufacturer logo, or a product logo). For example, a subset of LEDs 1304 can be arranged in a row of LED pairs, where a respective LED pair indicates a transmit status and receive status for a link.

Patch panel section 1302 can include a set of cable-fastener loops (e.g., loop 1310), each loop comprising two openings along the surface of patch panel section 1302 and an inner compartment that guides a cable fastener from one opening to the other. Patch panel section 1302 also includes a cover-fastener hole 1308 for fastening a patch panel cover to patch panel section 1302. Specifically, the patch panel cover can include a pin that fastens to the networking device chassis when inserted into cover-fastener hole 1308.

Figure 14:
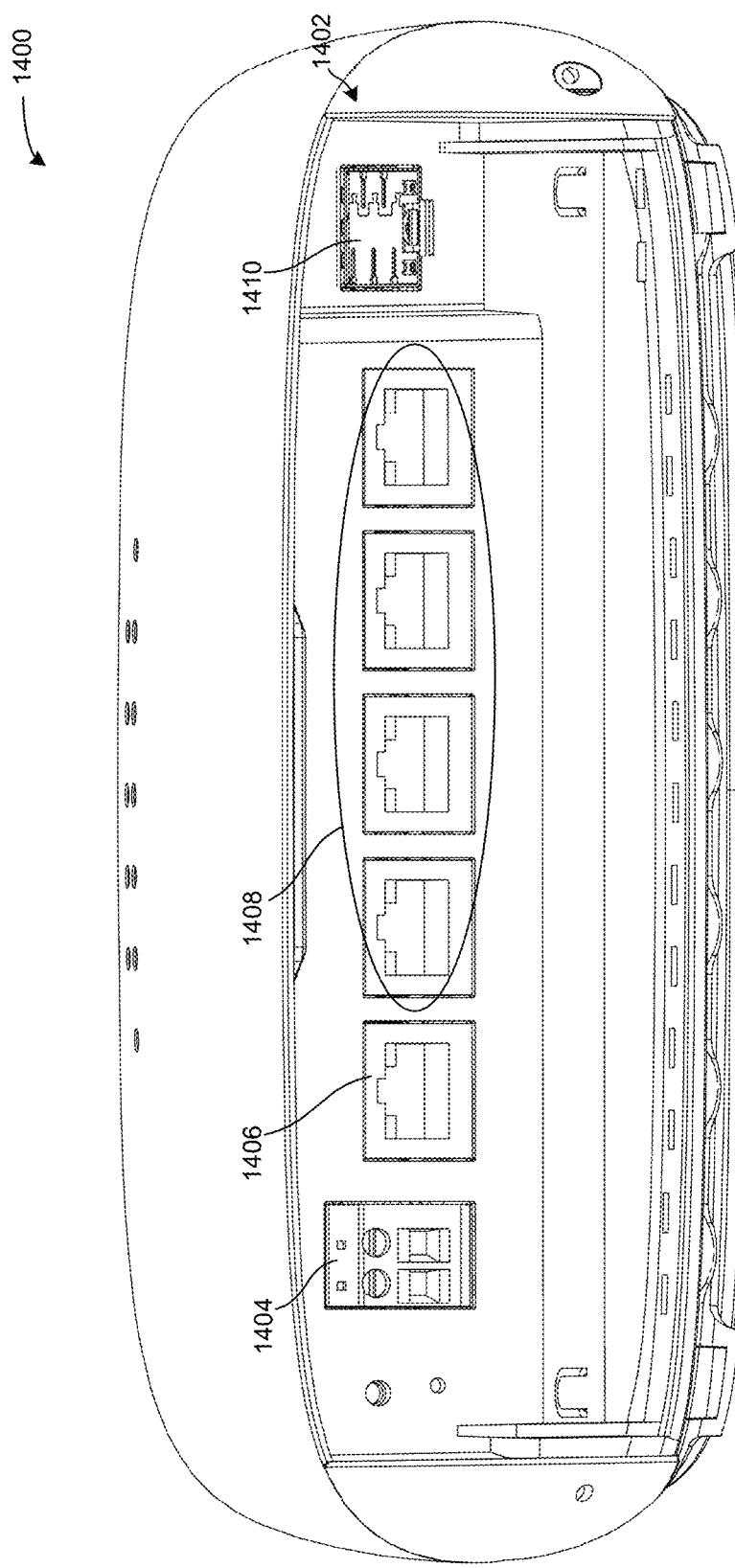
FIG. 14 illustrates a patch panel of a low-power networking device 1400 in accordance with an embodiment.

FIG. 14 illustrates a patch panel 1402 of a low-power networking device 1400 in accordance with an embodiment. Patch panel 1402 of networking device 1400 can include various terminals for receiving power, such as a 24 V terminal block 1404, a set of Power over Ethernet (PoE) ports 1406 and 1408, and a USB port 1410.

In some embodiments, edge server 1400 can receive power via a PoE port 1406. Hence, a primary power supply and a backup power supply can be coupled to any power input terminal of networking device 1400, such as by coupling a high wattage power supply to 24 V terminal block 1404, and/or by coupling a PoE adapter to PoE port 1406.

Moreover, PoE ports 1408 can be used to send and/or receive data. For example, one port of PoE ports 1406 or 1408 can be coupled to an Internet service provider (ISP), and one or more additional PoE ports 1408 can each be coupled to an antenna to relay a network connection to a remote station.

Figure 15:
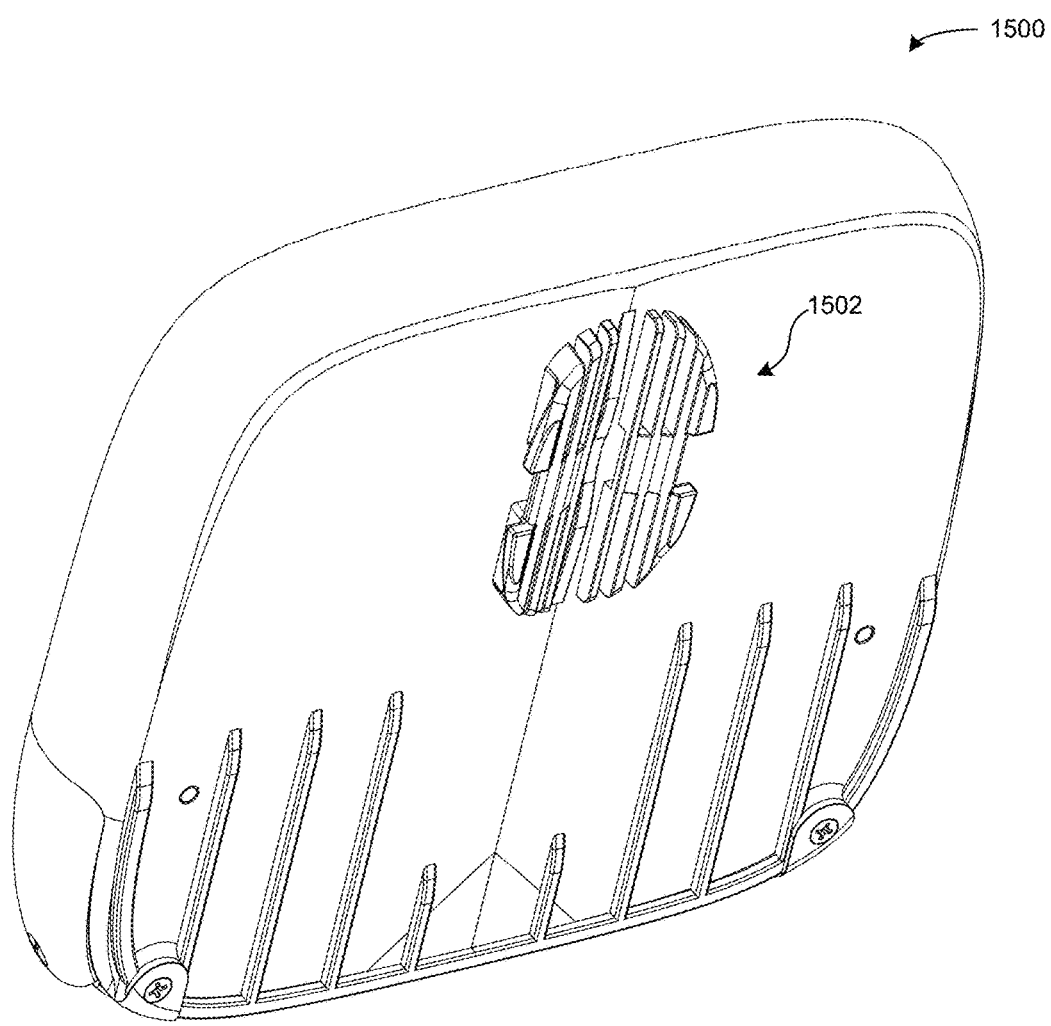
FIG. 15 illustrates a pole-mount feature of a low-power networking device 1500 in accordance with an embodiment.

FIG. 15 illustrates a pole-mount feature 1502 of a low-power networking device 1500 in accordance with an embodiment. Specifically, pole-mount feature 1502 includes a set of vertically aligned protrusions that may extend above the surface of networking device 1500. The set of protrusions can have varying heights to form a curved shape that can contour a pole's curved surface.

Figure 16:
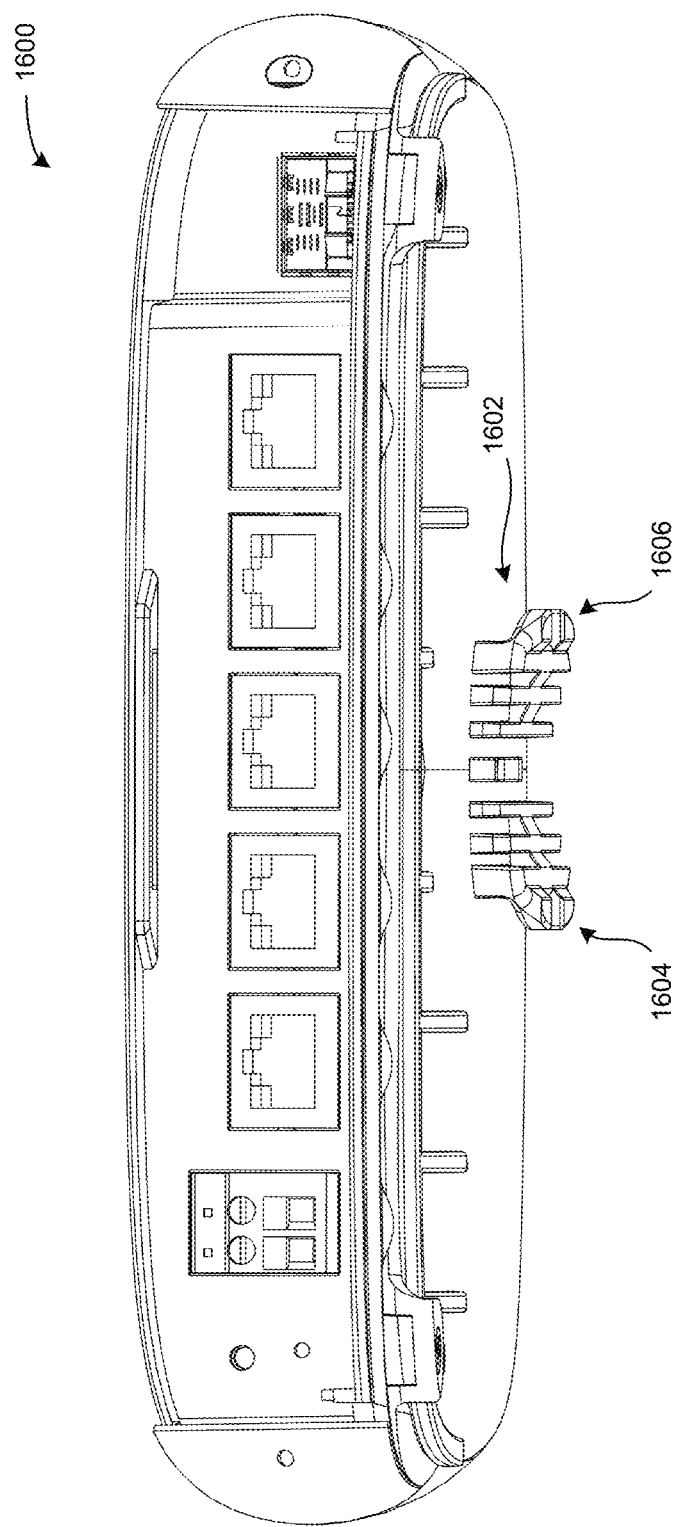
FIG. 16 illustrates a curved contour of a pole-mount feature in accordance with an embodiment.

FIG. 16 illustrates a curved contour of a pole-mount feature 1602 in accordance with an embodiment. Specifically, a rear chassis of a networking device 1600 can include a rear flat surface, and can include a pole-mount feature 1602 that extends beyond the rear flat surface.

Pole-mount feature 1602 can have a curved shape that may contour a pole's curved surface. Pole-mount feature 1602 can also include rails 1604 and 1606 at opposing sides of pole-mount feature 1602. Rails 1604 and 1606 facilitate attaching a wall-mount attachment (not shown) over pole-mount feature 1602 by sliding the wall-mount attachment along rails 1604 and 1606. For example, a user can install the wall-mount attachment onto networking device 1600 by sliding rails 1604 and 1606 into corresponding slots of the wall-mount attachment in a vertical direction (e.g., in a downward direction), until rails 1604 and 1606 reach a fastened position within the wall-mount attachment. In some embodiments, rails 1604 and 1606 reach a fastened position when they make contact with a bottom portion of the wall-mount attachment.

Figure 17:
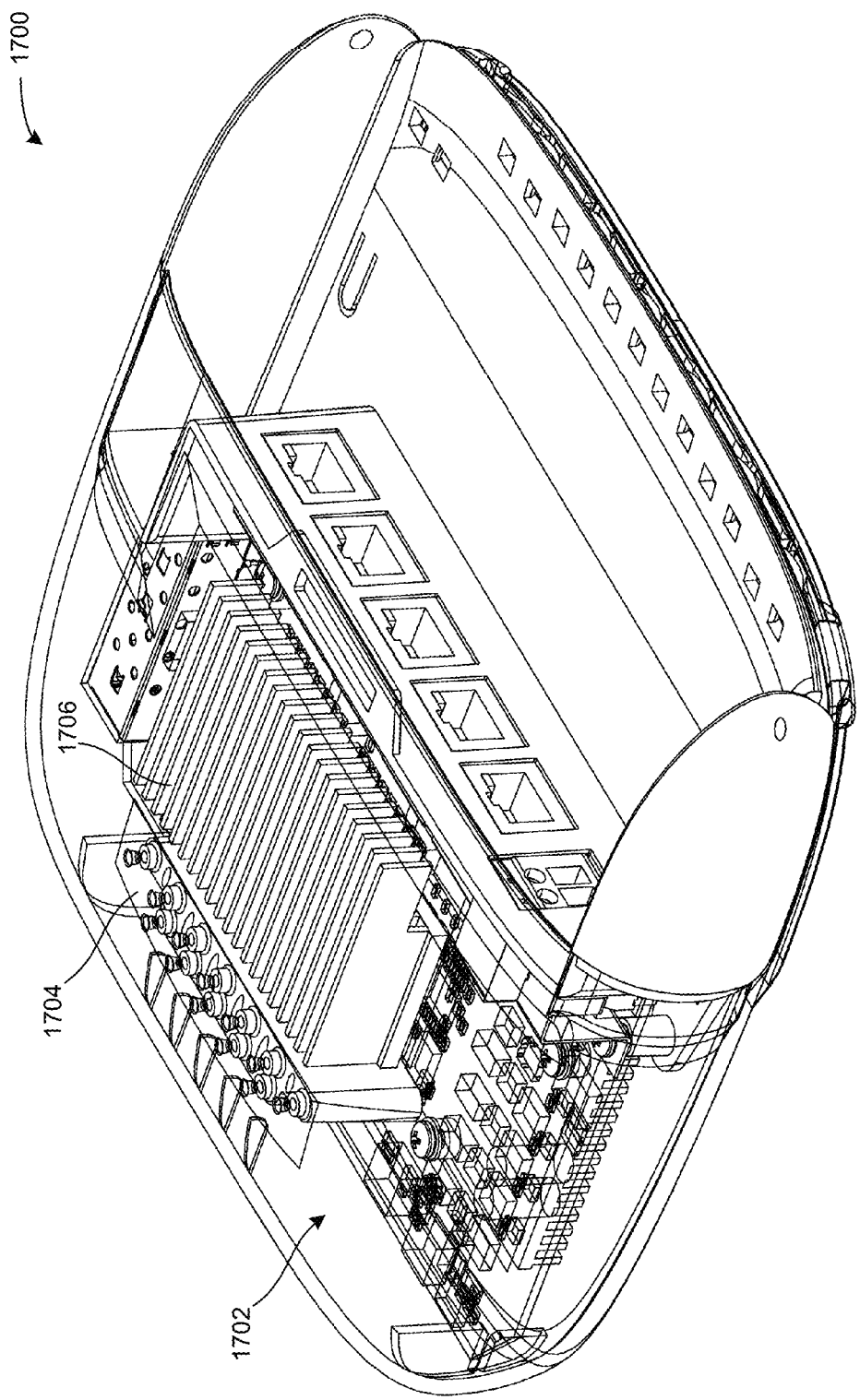
FIG. 17 illustrates a PCB compartment of a low-power networking device in accordance with an embodiment.

FIG. 17 illustrates a PCB compartment 1702 of a low-power networking device 1700 in accordance with an embodiment. Networking device 1700 does not include vents between compartment 1702 and the external environment, which protects circuits within compartment 1702 from the external environment, such as from dust, rain, and other weather phenomenon. Rather, networking device 1700 can include a heat radiator 1706 that radiates heat away from a motherboard, and onto the chassis of networking device 1700. The heat can radiate away from the chassis to the external environment. PCB compartment 1702 can also include a light pipe assembly 1704, which can include a set of light emitting diodes (LEDs) without allowing a significant amount of light to bleed between neighboring LEDs.

Figure 18:
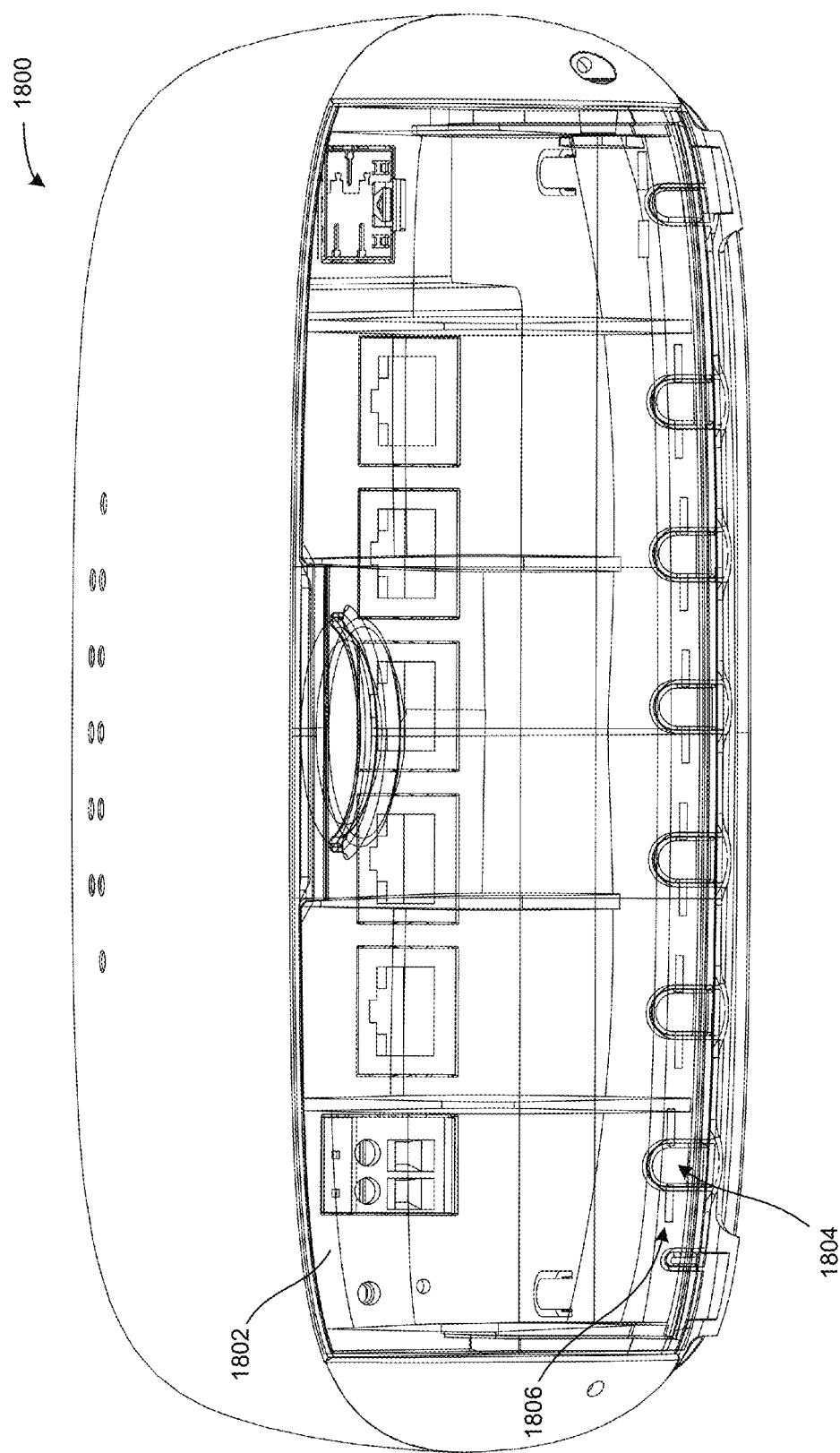
FIG. 18 illustrates a cover plate of a networking device in accordance with an embodiment.

FIG. 18 illustrates a cover plate 1802 of a networking device 1800 in accordance with an embodiment. For illustration purposes, cover plate 1802 is shown as a transparent line drawing to reveal a connector panel and a set of cable-fastening loops. Specifically, cover plate 1802 covers a patch panel, and can include a set of cable holes that are each covered with a breakaway cover (e.g., breakaway cover 1804). When the user needs to run a cable through a hole of cover plate 1802, the user can remove the breakaway cover that covers the cable hole. The user can fasten one or more cables to a cable-fastening loop (e.g., cable-fastening loop 1806) by running a fastener (e.g., a cable tie) through the cable-fastening loop, and fastening the fastener around the one or more cables.

Hence, fastening a set of cables to the cable-fastener loops (e.g., using cable ties) effectively aligns these cables to the cable holes of cover plate 1802. This makes it easier for the user to install cover plate 1802 back onto networking device 1800, as the cables remain aligned to the cable holes of cover plate 1802 with little or no additional effort required by the user to re-align the cables to the cable holes while installing cover plate 1802.

Figure 19:
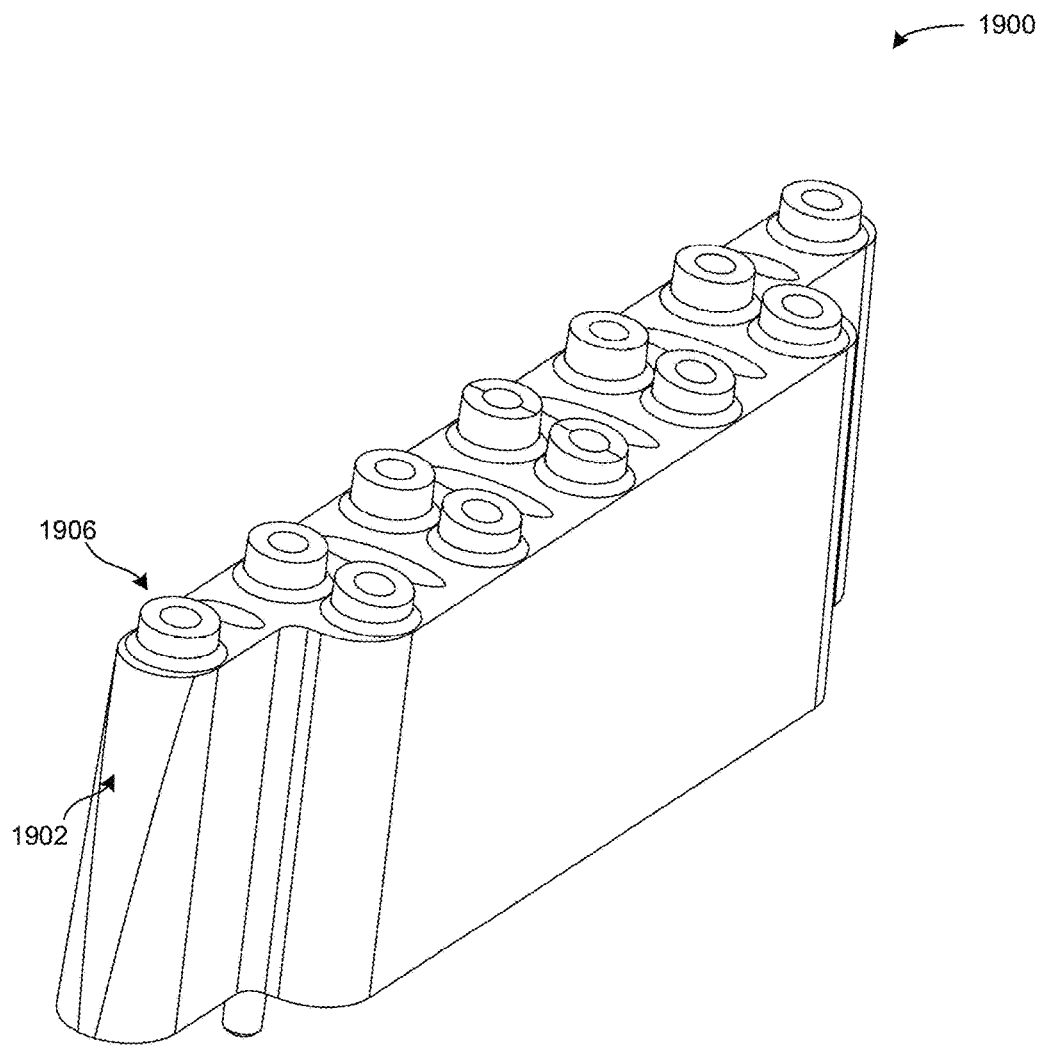
FIG. 19 illustrates an exemplary light pipe assembly of a networking device in accordance with an embodiment.

FIG. 19 illustrates an exemplary light pipe assembly 1900 of a networking device in accordance with an embodiment. Light pipe assembly 1900 includes two rows of light pipes. Each light pipe can include an LED within a slot of the light pipe, such that the light pipe prevents light from a rear portion of the LED from escaping to a neighboring LED. Hence, light pipe assembly 1900 can reduce or eliminate an amount of light that bleeds between neighboring LEDs.

Cloud-Based Management of Remote Stations

Embodiments of the present invention also provide a cloud-based controller that allows a technician to determine the status of a plurality of networking devices deployed over a wide area. The cloud controller can ping each of the deployed networking devices to determine its status, and can present this status information to the user in a unified UI. In some embodiments, the cloud controller can include a computer cluster that manages a plurality of networking devices for an entity (e.g., an ISP, or a company with a closed network), or for multiple entities.

The cloud controller can get location information from each networking device, and can display the location of each networking device on a map, along with icons that each represents a current status of a corresponding networking device. The cloud controller can communicate with various networking devices remotely to keep track of their status and configuration, and can present this diagnostic information to the technician via the unified UI so that the technician does not need to diagnose a radio tower in-person. For example, the cloud controller can present diagnostic information for a networking device on a map UI. The diagnostic information can include a configuration of the networking device, performance information (e.g., throughput information), information on the radios or antennas coupled to the networking device, information on one or more power sources, etc.

The cloud controller can also provide a device-specific UI that displays status information and configuration options for a given networking device, such as which antennas are coupled to the networking device, the signal quality and bandwidth of each antenna, etc. This device-specific UI allows the technician to perform a detailed analysis of a given networking device, for example, to determine whether a given radio tower needs servicing, for example, to determine whether a given networking device or antenna needs to be repaired or replaced, etc.

Figure 20:
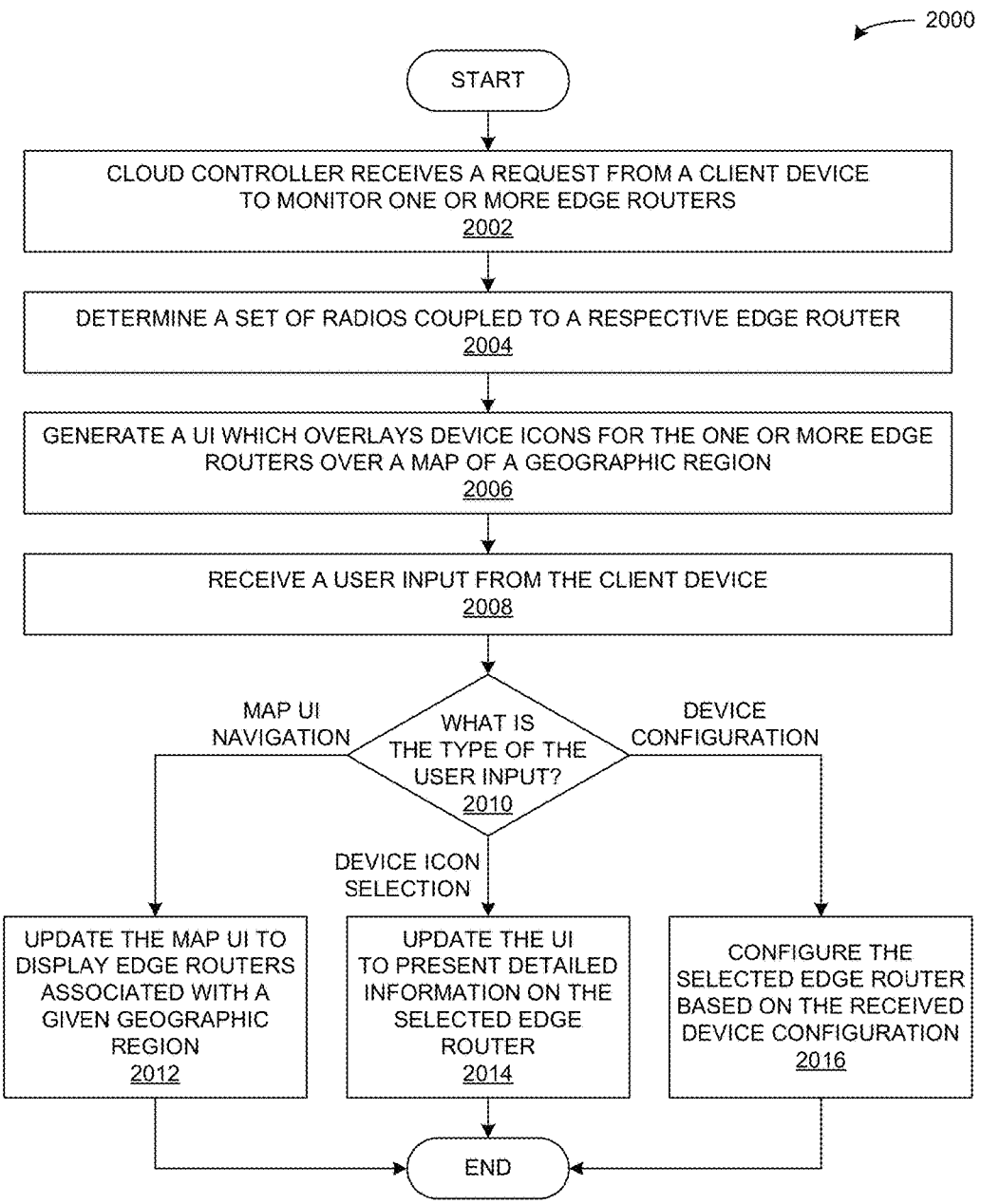
FIG. 20 presents a flow chart illustrating a method for managing a set of networking devices from a remote cloud controller in accordance with an embodiment.

FIG. 20 presents a flow chart illustrating a method 2000 for managing a set of networking devices from a remote cloud controller in accordance with an embodiment. During operation, the cloud controller can receive a request from a client device to monitor one or more networking devices (operation 2002), and determines a set of radios coupled to a respective networking device (operation 2004). The cloud controller then generates a user interface (UI) that overlays device icons for the one or more networking devices over a map of a geographic region (operation 2006).

In some embodiments, the UI can display status information for each networking device (e.g., in the device icon, or next to the device icon). The status information can include, for example, a network throughput for a predetermined network port of the networking device, a signal strength for a predetermined radio, an aggregate signal strength for one or more radios, and an average signal strength for one or more radios.

In some embodiments, the cloud controller can receive a user input from the client device (operation 2008), and analyzes the user input to determine a type of input that was submitted (operation 2010). The user input can be a map UI navigation input that selects a new geographic region to display in the map UI, in which case the cloud controller updates the map UI to display networking devices associated with the new geographic region (2012).

The user input can also be a device icon selection, which selects a networking device to monitor, in which case the cloud controller updates the UI to present detailed information on the selected networking device (operation 2014). The detailed information can include, for example, a configuration for one or more components of the networking device, and/or an operating state for the one or more components of the networking device. The detailed information can also include an alert associated with a misconfigured, underperforming, or malfunctioning components of the networking device, and/or a diagnosis associated with the alert.

In some embodiments, the user input can be a device configuration for a user-selected networking device, in which case the cloud controller configures the selected networking device based on the device configuration (operation 2016).

Figure 21:
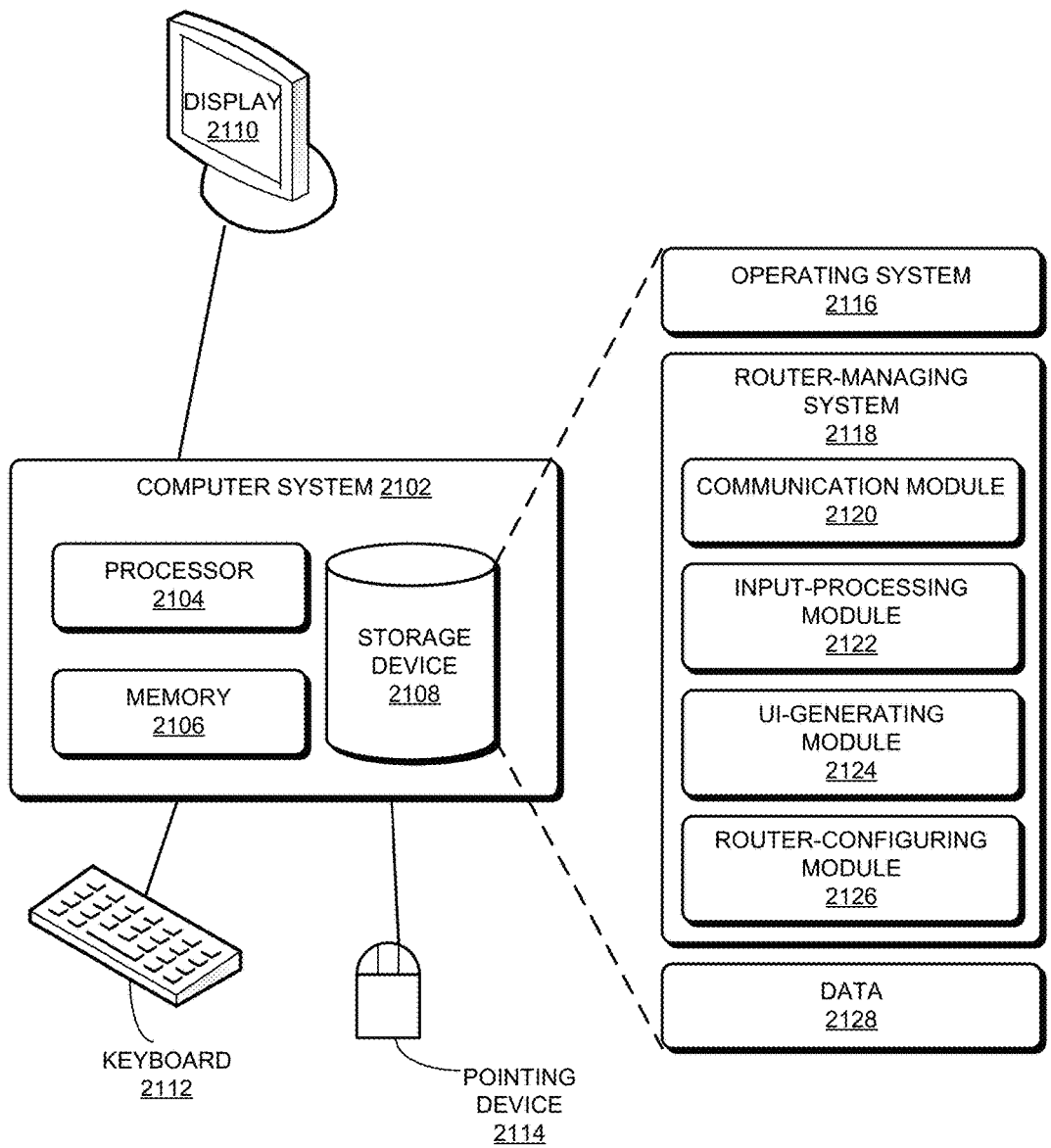
FIG. 21 illustrates an exemplary computer system that facilitates managing a set of networking devices in accordance with an embodiment.

FIG. 21 illustrates an exemplary computer system 2102 that facilitates managing a set of networking devices in accordance with an embodiment. Computer system 2102 includes a processor 2104, a memory 2106, and a storage device 2108. Memory 2106 can include a volatile memory (e.g., RAM) that serves as a managed memory, and can be used to store one or more memory pools. Furthermore, computer system 2102 can be coupled to a display device 2110, a keyboard 2112, and a pointing device 2114. Storage device 2108 can store operating system 2116, a router-managing system 2118, and data 2128.

Router-managing system 2118 can include instructions, which when executed by computer system 2102, can cause computer system 2102 to perform methods and/or processes described in this disclosure. Specifically, router-managing system 2118 may include instructions for receiving router-managing requests from a client device (communication module 2120), and may include instructions for processing a request from the client device (input-processing module 2122). Further, router-managing system 2118 can include instructions for generating or updating a UI to present status information for a plurality of networking devices over a map of a geographic region (UI-generating module 2124). Router-managing system 2118 can also include instructions for configuring one or more networking devices based on a configuration received in a request from the client device (router-configuring module 2126).

Data 2128 can include any data that is required as input or that is generated as output by the methods and/or processes described in this disclosure.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A tower-mounted computer networking apparatus, comprising:
    a mounting bracket for mounting the apparatus on a radio tower or wall;
    a first power and network port of the apparatus coupled to an external connection line from a source external to the tower or wall, wherein the external connection line provides at least power and a network connection to the apparatus;
    a first network port of the apparatus coupled to a connection line to a first radio device;
    a second network port of the apparatus coupled to a connection line to a second radio device;
    a power module to:
        receive power from the first power and network port;
        provide power to the first radio device via the first network port; and
        provide power to the second radio device via the second network port; and
    a packet-forwarding module to route network packets between the first power and network port and the first and second network ports.

2. The apparatus of claim 1, wherein a respective radio device includes one or more of:
    a radio transmitter;
    a radio receiver; and
    a radio transceiver.

3. The apparatus of claim 1, wherein the external connection line originates from one or more of:
    a ground-level power source;
    a ground-level telecommunications line;
    an overhead power line; and
    an overhead telecommunications line.

4. The apparatus of claim 1, wherein the packet-forwarding module is further configured to:
    route network packets between the first network port and the first power and network port; and
    route network packets between the second network port and the first power and network port.

5. The apparatus of claim 1, wherein the first radio device and the second radio device are mounted on the same parabolic reflector.

6. The apparatus of claim 1, wherein at least one of the first network port and the second network port is an optical fiber network connection port.

7. The apparatus of claim 1, further comprising:
    a conduit port for passing a set of cables into a connector enclosure of the apparatus;
    a strain-relief loop for winding an extra length of an optical fiber cable without bending the optical fiber cable beyond a maximum bending angle; and
    a strain-relief semi-circle approximately between the conduit port and the strain-relief loop that prevents an edge of the conduit port from bending the optical fiber cable beyond the maximum bending angle.

8. The apparatus of claim 1, further comprising:
    a conduit port for passing a set of cables into a connector enclosure of the apparatus; and
    a weather-proof sleeve coupled to the conduit port, and comprising a gasket at one end and an adjustable opening at an opposing end of the sleeve, wherein the radius of the adjustable opening is operable to be reduced to decrease a spacing between the adjustable opening and the set of cables.

9. The apparatus of claim 1, further comprising a second power port coupled to a power line from a solar panel mounted on the tower or wall.

10. The apparatus of claim 9, wherein the first power and network port is a primary power source, and wherein the second power port is a secondary power source.

11. The apparatus of claim 10, wherein the power module is further configured to:
    determine whether the primary power source is active; and
    responsive to determining that the primary power source is not active, receiving power from the secondary power source.

12. The apparatus of claim 1, wherein the mounting bracket includes at least one of:

a set of screw holes for mounting the apparatus on a flat surface; and a curved contour for mounting the apparatus on a pole.

13. The apparatus of claim 1, further comprising:

a patch panel on a front face of the apparatus, wherein the patch panel includes at least the first and second network ports; and a panel cover comprising a locking mechanism that, when the panel cover is installed over the patch panel, the locking mechanism penetrates through an enclosure of the apparatus to a rear face of the apparatus.

14. The apparatus of claim 13, wherein the locking mechanism includes a lock hole for a lock, and wherein attaching a lock through the lock hole secures the panel cover to the patch panel.

15. The apparatus of claim 1, further comprising:

a motherboard comprising two or more heat sources;

a heat sink;

two or more heat pipes, wherein a respective heat pipe is coupled to a corresponding heat source at one end, and wherein the two or more heat pipes are coupled to the same heat sink at an opposing end.

16. The apparatus of claim 15, wherein the two or more heat sources includes at least one or more of:

a communications microchip;

a microprocessor;

a power transistor;

a signal-amplifying microchip.

17. The apparatus of claim 15, wherein a rear face of the enclosure includes a set of heat fins that are in thermal contact with the heat sink.

18. The apparatus of claim 15, wherein a front face of the enclosure includes a set of heat fins above the heat sink.

19. The apparatus of claim 1, further comprising an enclosure which does not include a vent to protect the networking device from weather intrusion.

20. A computer-implemented method, comprising:

receiving, by a computer networking device mounted on a radio tower or wall, power via a first network port of the networking device coupled to an external connection line from a source external to the tower or wall;

providing power, from the power received via the first network port, to a first radio device via a second network port of the networking device, and to a second radio device via a third network port of the networking device; and routing network packets between the first network port and the second and third network ports.

21. The method of claim 20, wherein the external connection line does not include a network connection.

22. The method of claim 20, wherein the external connection line includes a network connection, and wherein the method further comprises:

routing network packets between the first network port and the second network port; and routing network packets between the first network port and the third network port.

23. The method of claim 20, further comprising:

receiving power from a second power port coupled to a power line from a solar panel mounted on the tower or wall.

24. The method of claim 23, wherein the power received from the first network port is a primary power source, and wherein the power received from the second power port is a secondary power source.

25. The method of claim 24, further comprising:

determining whether the primary power source is active; and responsive to determining that the primary power source is not active, receiving power from the secondary power source.

26. A tower-mounted computer networking apparatus, comprising:

a mounting bracket for mounting the apparatus on a radio tower or wall;

a first network and power port of the apparatus coupled to a connection line from a source external to the tower or wall, wherein the connection line provides power and a network connection to the apparatus;

a second network port of the apparatus coupled to a first radio device;

a power module to:

receive power from the first network and power port; and provide power to the first radio device via the second network port; and a packet-forwarding module to route network packets between the first power and network port and the first and second network ports.

27. The apparatus of claim 26, wherein the first network port is one or more of:

a Power-over-Ethernet (PoE) network port; and a Power-over-Fiber network port.

28. The apparatus of claim 26, wherein the second network port is a Power-over-Ethernet (PoE) port.

29. A computer-implemented method, comprising:

receiving, by a computer networking device mounted on a radio tower or wall, power via a first network port of the networking device coupled to an external connection line from a source external to the tower or wall;

receiving a network connection via the first network port from the source external to the tower or wall;

providing power, from the power received via the first network port, to a first radio device via a second network port of the networking device, and to a second radio device via a third network port of the networking device; and routing network packets between the first network port and the second and third network ports.

* * * * *